United States Patent [19]

Tawara et al.

[11] 4,254,498
[45] Mar. 3, 1981

[54] TIME DIVISION TELEPHONE SWITCHING SYSTEMS

[75] Inventors: Kanzi Tawara, Sekimachi; Kazuo Hamazato, Itsukaichi; Tatsuro Takahashi, Yokohama; Tetsuaki Egawa, Tokyo, all of Japan

[73] Assignee: Nippon Telegraph and Telephone Public Corporation, Japan

[21] Appl. No.: 2,208

[22] Filed: Jan. 9, 1979

[30] Foreign Application Priority Data

Feb. 1, 1978 [JP] Japan .................................. 53-10665
Feb. 1, 1978 [JP] Japan .................................. 53-10666
Feb. 1, 1978 [JP] Japan .................................. 53-10667
Feb. 1, 1978 [JP] Japan .................................. 53-10668
Oct. 19, 1978 [JP] Japan ................................ 53-127800

[51] Int. Cl.³ ........................................... H04Q 11/04
[52] U.S. Cl. ........................................ 370/63; 370/16
[58] Field of Search ........ 179/15 AT, 15 AQ, 15 BF; 370/63, 64, 60, 68, 16, 13

[56] References Cited

U.S. PATENT DOCUMENTS

| B 327,612 | 1/1975 | Edstrom et al. | 179/15 AT |
|---|---|---|---|
| 3,906,164 | 9/1975 | Philip et al. | 179/15 AT |
| 3,920,914 | 11/1975 | Regnier et al. | 179/15 AT |
| 3,956,593 | 5/1976 | Collins et al. | 179/15 AT |
| 4,037,054 | 7/1977 | Neufang | 179/15 BF |
| 4,048,445 | 9/1977 | Ghisler | 179/15 BF |
| 4,146,749 | 3/1979 | Pepping et al. | 179/15 AT |
| 4,160,127 | 7/1979 | Slana et al. | 370/63 |

*Primary Examiner*—Douglas W. Olms
*Attorney, Agent, or Firm*—Charles W. Helzer

[57] ABSTRACT

The telephone switching system comprises a plurality of speech path units, a juncture switch unit for interconnecting the speech path units, a central processing unit for controlling the speech path units and the junctor switch unit. Each speech path unit comprises a time switch which shifts a signal which is time-division-multiplexed from time slots of a plurality of incoming highways to other time slots on a plurality of outgoing highways, a digital trunk circuit for processing a register signal received by the time slot and other control signals, and a speech path control equipment which receives and distributes a control signal between the time division switch, the digital trunk circuit and the central processing unit. The junctor switch unit is constructed to change the connections between the speech path units by using a plurality of time slots as one group, whereby the change of connection between respective speech path units by the junctor switch and effects changes in terms of a group units of a plurality of time slots when the number of the speech path units is varied.

27 Claims, 38 Drawing Figures

F I G. 27
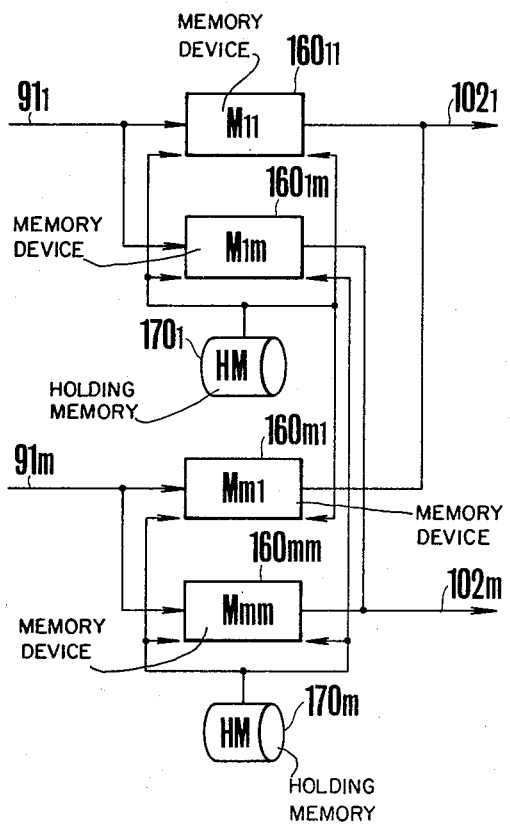

TIME DIVISION TELEPHONE SWITCHING SYSTEMS

BACKGROUND OF THE INVENTION

This invention relates to a time division telephone switching system.

A time division telephone switching system is generally constructed to exchange multiplexed signals which are sent over a plurality of incoming highways on a time division basis with time slots or channels of a plurality of outgoing highways. Such time division telephone exchange system is described, for example, in "The Bell System Technical Journal", Vol. 56, No. 7, 1977. The time division telephone switching system described in this journal has a construction as shown in FIG. 1 of the accompanying drawing. Briefly stated it comprises a trunk circuit 1 (hereinafter called TRK) which receives and transmits voice signals through voice frequency lines 2 (hereinafter called VL) and transmits line signals or channel associated signals, a CODEC 3 which converts analogue signals supplied from the trunk circuit 1 into digital time division multiplexed signals and a synchronizing circuit 4 (hereinafter called SYNC) which receives and transmits time division multiplexed signals over a digital line 5 and separates portions of the signals which contain the register signal and the line signal and transmits the separated portions. SYNC 4 synchronizes the frequency and phase of the time division multiplexed signal sent over the digital line 5 with a clock pulse of the time division telephone exchange and multiplexes and demultiplexes so as to coordinate the time division multiplexing of the time division telephone exchange with the time division multiplexed signal sent over the digital line 5. This time division telephone switching system further comprises a time division switching networks (TDNW) 6a and 6b for active mode and stand-by mode which are connected to CODEC 3 and SYNC 4 through changeover switches 7a and 7b respectively, and speech path controler (hereinafter called SPC) 8a and 8b for active and stand-by modes, which control the trunk circuit 1, SYNC 4 and the time division switching networks 6a and 6b. SPC 8a and 8b are connected to TRK 1, SYNC 4 and TDNW 6a and 6b through changeover switches 9, 10 and 11. Central processing units (CC) 12a and 12b of the active and stand-by modes are connected to SPC 8a and 8b through a changeover switch 13 for controlling all circuit elements through SPC 8a and 8b.

The time division telephone switching system described above receives a line signal sent over the voice frequency line 2 to TRK 1 which supplies the discriminating signal of a register signal and a channel associated signal to the active mode SPC 8a through the changeover switch 9. The voice frequency signal received by TRK 1 is supplied to CODEC 3 where it is converted into a time division multiplexed signal (including coincidence of the frequency and phase) which accords with predetermined conditions of the time division telephone exchange in the CODEC 3 and then applied to the active mode TDNW 6a. Under the control of CC 12a, SPC 8a controls TDNW 6a in accordance with a dial register signal and a line signal for transferring time division multiplexed voice signals allocated to respective time slots to time slots designated by the dial register signal.

The time slot containing the register signal and the line signal of the time division multiplexed signal is supplied via the digital line 5 and is separated by SYNC 4 and the separated time slot signal is applied to SPC 8a. SPC 8a identifies the register signal and the line signal by analysis of the signal supplied from SYNC 4 to control the time division switching network 6a under the control of CC 12a thus transferring the time division multiplexed voice frequency signal allocated to respective time slots to time slots designated by the register signal.

Where a fault occurs in any one of the time division switching unit 6a, the speech path control equipment 8a or the central processing unit 12a, a fault supervisory circuit, not shown, actuates corresponding one of the changeover switches 7a, 7b, 9, 10, 11 and 13 for changing over the faulty and places the stand-by unit in the active mode to a stand-by mode unit.

The switching operation described above is also performed between the voice frequency line 2 and the digital line 5.

With the time division telephone exchange described above, since the line signal supplied through the voice frequency line 2 is transmitted and received by TRK 1, and since the line signal supplied through the digital line 5 is transmitted and received by SYNC 4, the transmission and reception of these two signals and various control signals are processed differently so that the control procedure is extremely complicated and it is necesary to install a great number of signal lines between the many units and circuits. Accordingly, when it is desired to expand or contract the telephone network of such a time division switching system it is necessary not only to rearrange a large number of control lines but also to change various control procedures.

SUMMARY OF THE INVENTION

Accordingly, it is the principal object of this invention to provide an improved time division telephone switching system capable of economically and readily increasing or decreasing the switching network capacity.

Another object of this invention is to provide an improved time division telephone switching system constructed so that not only hardware but also software is utilized to control the speech path as modules.

Still another object of this invention is to provide a time division telephone switching system capable of decreasing the amount of service work involved as well as the amount of program processing not only when faults occur but also during an expansion of the network.

A further object of this invention is to provide a simplified time division telephone switching system capable of decreasing the number of components such as junctor switch holding memory devices, and the amount of controls executed by these components.

A still further object of this invention is to provide a time division telephone switching system wherein shut down of the entire system can be prevented even if a dual or tripple fault occurs.

Another object of this invention is to provide a novel time division telephone switching system wherein the capacity of the time division speech network can be increased in an easy and economical manner.

According to this invention, these and further objects can be accomplished by digitally processing the transmission and reception of the line signals into and out of the time division telephone switching system with a digital trunk circuit and by assembling the digital trunk circuit, the time switch and the speech path control equipment into a speech path unit of a definite capacity. The speech path unit is constructed as a module so as to increase or decrease the switching network capacity by combining a plurality of such modules in the manner of a building block structure.

According to this invention these and further objects can be accomplished by providing a time division multiplexed telephone switching system comprising a plurality of speech path units, junctor switch units for interconnecting the plurality of speech path units, a central processing unit for effecting an overall control of the speech path units; each speech path unit comprising time switch for exchanging a time division multiplexed signals so as to form the signals into a plurality of groups of time slots with each group comprising a plurality of time slots; digital trunk circuit means which processes a channel associated signal containing a register identification signal and a line operating state signal; and a speech path control equipment which is connected to receive and transmit a control signal between the time switch, the digital trunk circuit and the central processing unit, the junctor switch unit establishing connections and reconnections between respective speech path units by treating a plurality of time slots as one group.

BRIEF DESCRIPTION OF THE DRAWINGS

Further objects, advantages and organization of the invention can be more fully understood from the following detailed description taken in conjunction with the accompanying drawings in which:

FIG. 27 is a block diagram showing a modification of the system shown in FIG. 25 which is incorporated with a pair control.

DESCRIPTION OF THE PREFERRED EMBODIMENTS

Figure 1:
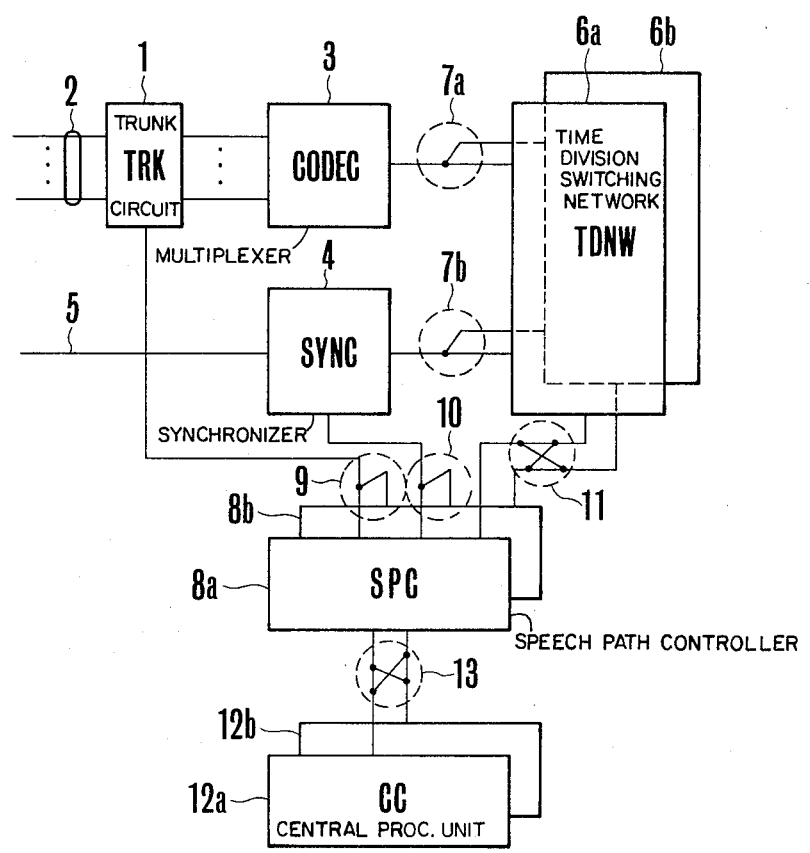
FIG. 1 is a block diagram showing one example of a prior art time division telephone switching system.
Figure 2:
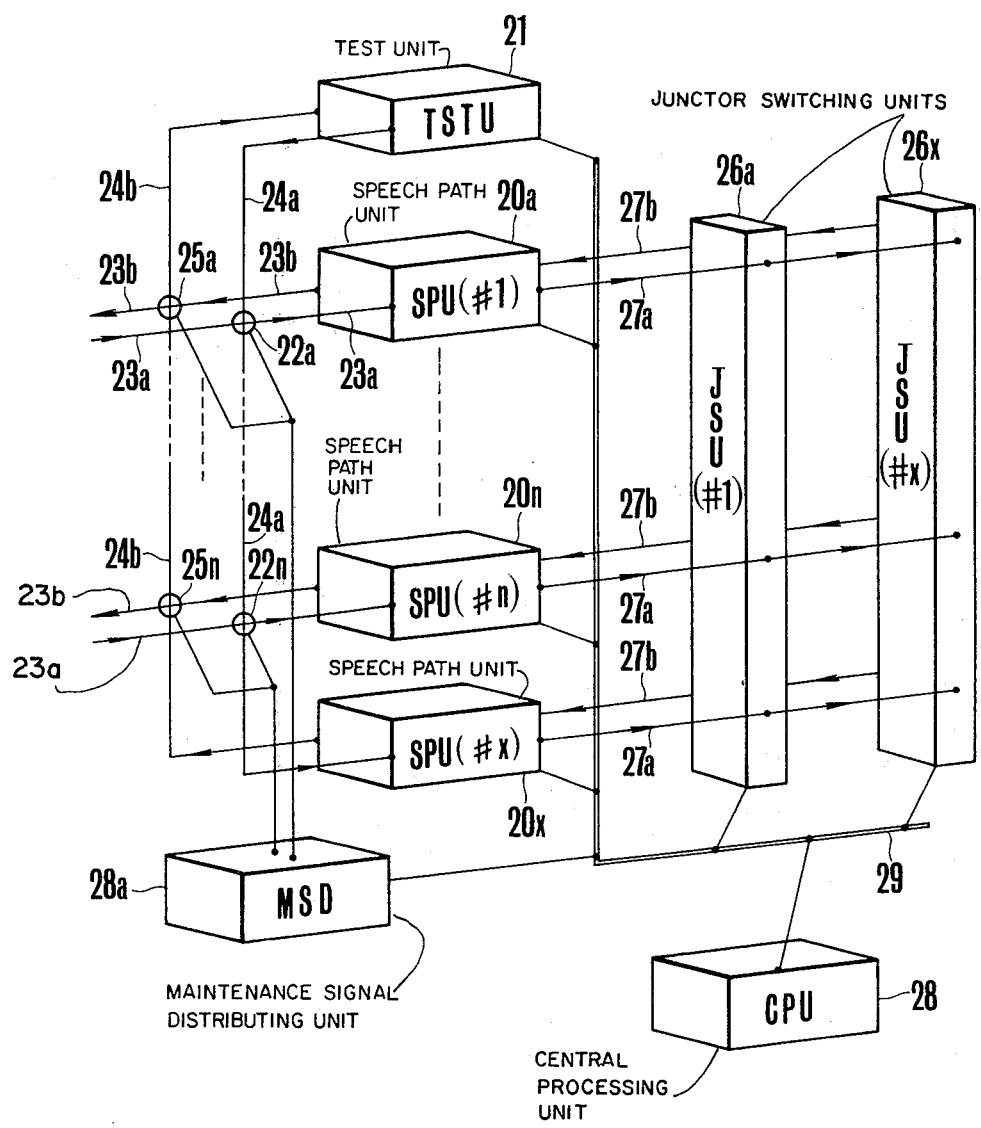
FIG. 2 is a block diagram showing one embodiment of the time division telephone switching system according to this invention.

FIG. 2 is a block diagram showing the basic construction of the time division telephone switching system according to this invention. The system of FIG. 2 comprises a plurality of active mode speech path units (SPU) 20a–20n and a stand-by speech path unit 20x, the units 20a–20n and 20x being integrated into a unit having a predetermined switching network capacity. The system further includes a test unit 21 (TSTU) for testing the speech path units 20a–20n and 20x, and incoming transfer switches (TRF) 22a–22n which are respectively provided at cross-overs between incoming highways 23a of respective speech path units 20a–20n and the maintainance incoming highway 24a connected between the test unit 21 and the stand-by speech path unit 20x. Outgoing transfer switches (TRB) 25a–25n are provided at respective crossovers between the outgoing highway 23b of the respective speech path units 20a–20n and the maintainance outgoing highway 24b extending between the stand-by speech path unit 20x and the test unit 21. Active and stand-by mode junctor switch units (JSU) 26a and 26x are provided which connect as a unit for a number of time slots between the speech path units 20a–20n via junctor highways 27a and 27b; and a central processing unit (CPU) 28 is provided which sends out a control signal through a control signal bus line 29 for performing overall control of speech path units 20a–20n and 20x, the test unit 21, and the junctor switch units 26a and 26b. CPU 28 also performs the analysis of various data at the time of fault and tests and the transfer instruction of incoming and outgoing transfer switches 22a–22n and 25a–25n through a maintainance signal distributing unit (MSD) 28a, which operates the transfer switches described above under the control of the central processing unit 28. Although, each of the incoming and outgoing highways 23a and 23b is represented by a single line, actually it comprises a plurality of lines acting as a highway for transmitting time division multiplexed digital signals. Thus, these incoming and outgoing highways 23a and 23b are connected to a plurality of CODECs 3 and to a plurality of synchronizing circuits 4 SYNCS such as are shown at 3 and 4, respectively, in FIG. 1. It should be understood that the time division multiplexed digital signal contains the multiplexed control information necessary to effect exchange connection processing as the register signal and the line signal in addition to the voice signal (allocated to idle time slots, for example).

In the time division telephone switching system constructed as above described, the digitalized voice signal supplied through the incoming highway 23a is exchanged, both in space and time, by the speech path units 20a-20n and by the junctor switch unit 26a under the control of the central processing unit 28 and then sent to a CODEC or a synchronizing circuit, not shown, through the outgoing highway 23b. As will be described later in detail, each one of the speech path units 20a-20n contains means for analyzing and identifying such digitalized control signals and line signals so that the speech path unit and the junctor switch unit execute the control for ordinary time division switching operation. Consequently, the central processing unit 28 is required to perform only the overall control of speech path units 20a-20n and 20x.

For this reason, even when the number of the speech path units is increased or decreased like a building block structure, it is only necessary to slightly modify the junctor switch unit 26a. This is possible because a portion of the task of analyzing and processing such control signals as the register signal and line signal is distributed among the various speech path units.

When a fault occurs in the speech path unit 20a, for example, in response to a fault detection signal supplied from a conventional fault supervisory circuit, not shown, the central processing unit 28 controls through the maintainance signal distributing unit 28a, the incoming and outgoing transfer switches 22a and 25a so as to exchange the faulty speech path unit 20a with the stand-by speech path unit 20x. Thereafter, the telephone switching operation is continued by using the speech path unit 20x. As a result of the transfer operation of the incoming and outgoing transfer switches 22a and 25a, the maintainance incoming and outgoing highways 24a and 24b which previously have connected the test unit 21 to the stand-by speech path unit 20x, now would be connected to the faulty speech path unit 20a. Hence the test unit 21 can test the speech path unit 20a which has been disconnected from the main switching system owing to the occurrence of a fault, and the test result supplied to the central processing unit 28 through the control signal bus line 29. Having completed the description regarding the construction and operation of the block diagram shown in FIG. 2, the construction of the speech path units 20a-20n and 20x will be described in detail.

Figure 3:
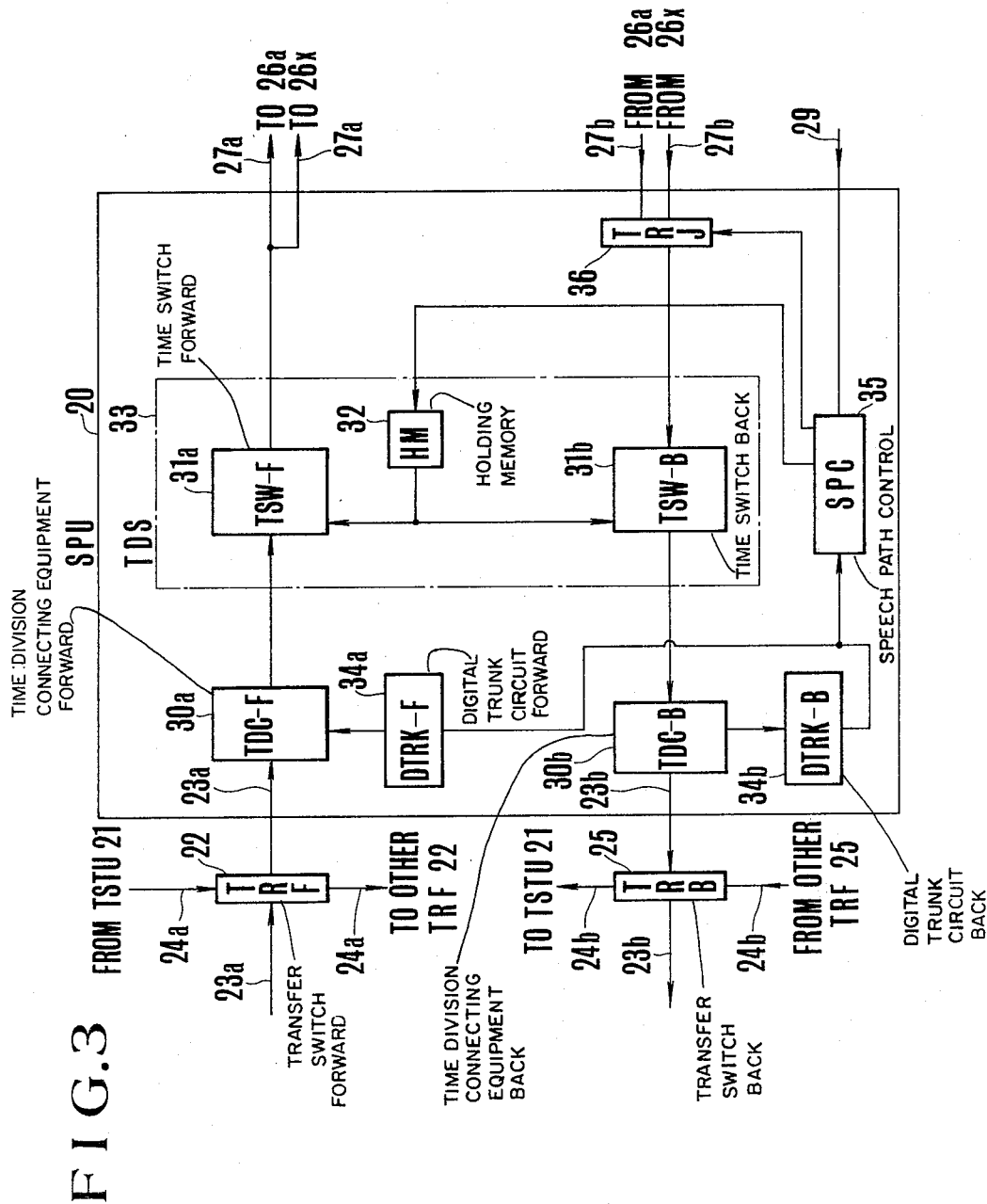
FIG. 3 is a block diagram showing the detailed construction of the speech path unit shown in FIG. 2.

FIG. 3 shows certain of the details of construction of the speech path units (SPU), such as 20a-20n and 20x shown in FIG. 2; however, in FIG. 3, for convenience, corresponding to those shown in FIG. 2 are designated by the same reference numerals without subscripts. In FIG. 3, 30a and 30b are forward and backward time division speech path connecting equipments (TDC-F, TDC-B) connected to the incoming transfer switches (TRF) 22 and the outgoing transfer switches (TRB) 25, respectively. Elements 31a and 31b are time switches (TSW-F, TSW-B) respectively connected to the time division speech path connecting equipments 30a and 30b, and 32 represents a holding memory circuit (HM) for controlling the storing or reading out position (timing) of the time switches 31a and 31b. The time switches 31a, 31b and the holding memory circuit 32 constitute a time division switching equipment (TDS) 33. The forward time division speech path connecting equipment (TDC-F) 30a is connected by the incoming transfer switch (TRF) 22 to receive digital signals sent over the incoming highway 23a and to match the timing with the switching system standard clock pulse for performing the time division switching operation. If desired, for the purpose of constructing the time switch 31 with an economical low speed memory device, the forward time division speech path connecting equipment 30a is constructed to perform a portion of the series-parallel conversion and the multiplexing conversion. The time switch (TSW-F) 31a is constructed to receive and store the time division multiplexed signals from the forward time division speech path connecting equipment (TDC-F) 30a and is operated under the control of the holding memory circuit (HM) 32. The secondary time switch (TSW-B) 31b is connected to receive and store the signals from the junctor switch unit (JSU) 26 for effecting the switching operation under the control of the holding memory circuit.

Generally, the time switches 31a and 31b operate to receive the signals sent from the incoming highway and store the multiplexed signals in speech path memory devices comprising several randam access memorys (RAM). When the stored signals is read out by being addressed by the holding memory circuit they are sent out to the outgoing highway.

Reference characters 34a and 34b designate digital trunk circuits (DTRK-F, DTRK-B) which receive and identify (or operate reversely) such control signals as the register signal and the line signal which have been allocated to idle channels by the digital multiplex processing technique. The control signals also include such interoffice signals as a multi-frequency signal and a supervisory signal, various tone signals. Element and test signals 35 represents a speech path control equipment (SPC) acting as an interface between holding memory circuit (HM) 32, digital trunk circuits 34a and 34b, and central processing unit 28 via control signal bus line 29 for receiving, distributing and partially preprocessing the control signals. Element 36 designates a junctor transfer switch (TRJ) which selects which junctor switch unit (JSU) 26a or 26x, shown in FIG. 2, are to be used.

In the speech path unit (SPU) 20 constructed as above described, the time division multiplexed voice signal and the line signal which are supplied through the incoming highway 23a are applied to the forward time division speech path connecting equipment (TDC-F) 30a through the incoming transfer switch (TRF) 22. The forward time division speech path connecting equipment (TDC-F) 30a receives the digitalized signal for matching the timing and condition with the standard clock pulse of the switching system which is used when the time division switching operation is performed. The forward time division speech path connecting equipment 30a executes the series-parallel conversion and a portion of the time slot multiplex operation for the purpose of obtaining the economized time switching processing whereby a plurality of time slots may be treated as one group by the junctor switch units. The digital trunk circuit (DTRK-F) 34a supplies such control signals as the register signal and the line signal to the forward time division speech path connecting equipment (TDC-F) 30a under the control of the speech path control equipment (SPC) 35, which sends information for effecting the switching processing in the holding memory circuit (HM) 32 under the control of the central processing unit (CPU) 28. In response to the exchanged information, the holding memory circuit (HM) 32 controls the time switch (TSW-F) 31a for transferring the information to a time slot position thereby exchanging the incoming voice signal and the line signal. Since the holding memory circuit 32 is well known in the art it is considered unnecessary to describe its construction and operation.

On the otherhand, the digital trunk circuit (DTRK-B) 34b digitally processes the line signals received from other offices through forward time division speech path connecting equipment (TDC-F) 30a, time switch (TSW-F) 31a, junctor switch unit (JSU) 26a (FIG. 2) and time switch (TSW-B) 31b and backward time division speech path connecting equipment (TDC-B) 30b, and sends the result of processing to the central processing unit (CPU) 28 (FIG. 2) via the speech path control unit (SPC) 35 and control signal bus line 29.

Figure 4:
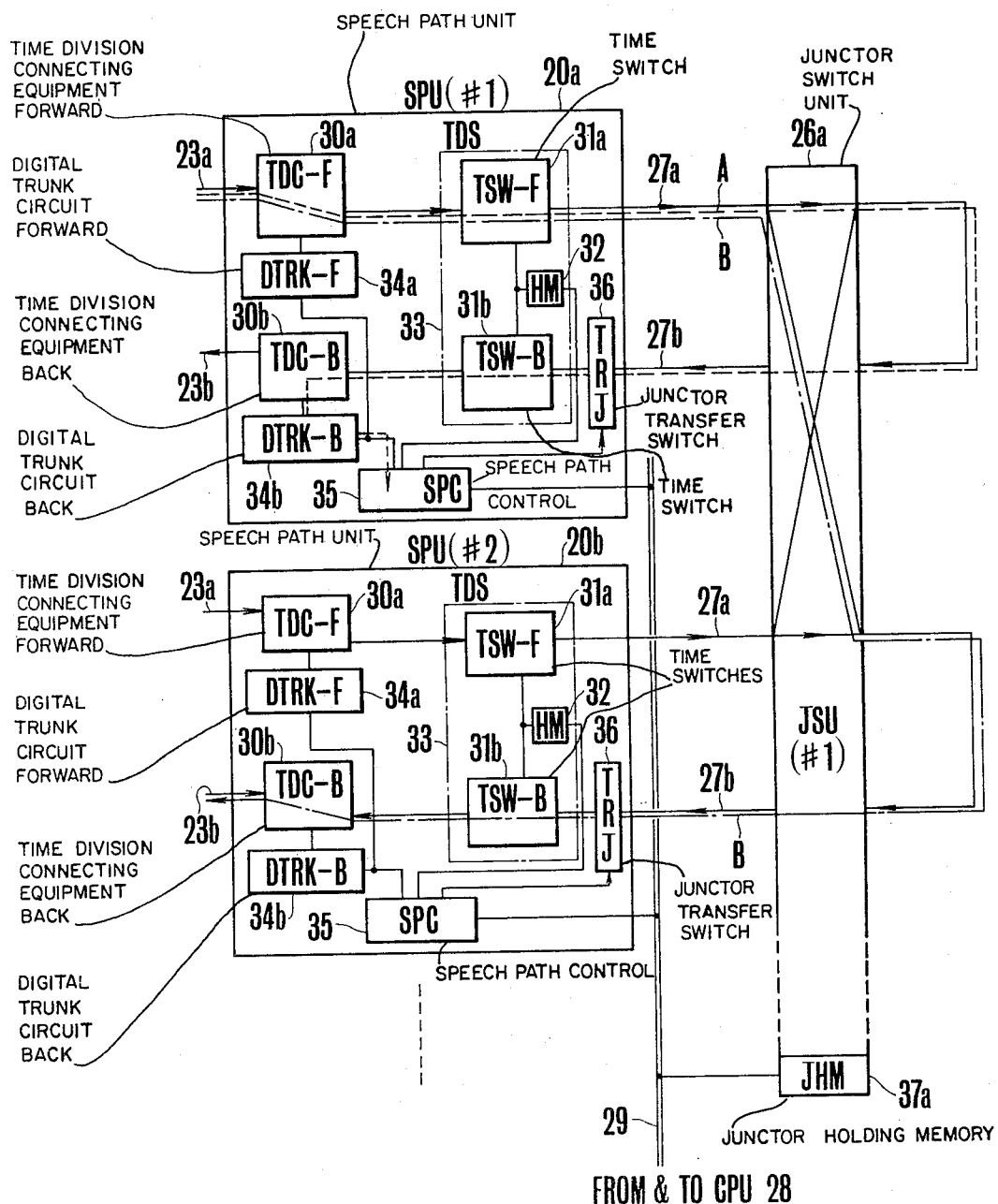
FIG. 4 is a block diagram useful to explain the switching operation of the telephone switching system of this invention by utilizing the speech path unit shown in FIG. 3.

FIG. 4 is a connection diagram showing the interoffice line signals between two speech path units 20a and 20b and the junctor switch unit (JSU) 26a in which components identical to those shown in FIGS. 2 and 3 are designated by the same reference characters.

In FIG. 4 a route A shown by dotted lines indicates the path of a line signal which is sent from other offices via such digital terminating equipment as the CODEC 3 or synchronizing circuit 4 described above by utilizing a specific idle time slot of the highway 23a. The route A is used to semipermanently apply the time slot of a line signal transmitted over the highway 23a to the digital trunk circuit DTRK-B 34b of SPU 20a. Suppose now that a line signal is supplied to the digital trunk circuit (DTRK-B) 34b via this semipermanently established signal path, the digital trunk circuit (DTRK-B) 34b would receive such control signals as the register signal and the line signal and supply them to the speech path control equipment (SPC) 35. (SPC) 35 translates and identifies the control signals by itself or under the control of the central processing unit (CPU) 28 and then, depending upon the result thereof, performs the switching operation by controlling the time switches 31a and 31b if connection is to be established between the time slots in the speech path unit (SPU) 20a.

In this manner, when an input is applied to an outgoing highway containing its own speech path unit, the speech path control equipment (SPC) 35 would receive a line signal through digital trunk circuit (DTRK-B) 34b so that the speech path control equipment 35 controls the time switches (TSW-F) 31a and (TSW-B) 31a and 31b through the holding memory circuit (HM) 32 by itself or under the control of the central processing unit (CPU) 28 for connecting the input to the outgoing highway 23b. The line signal to the other office is sent from the digital trunk circuit (DTRK-B 34b through the semipermanent path.

When it is desired to connect this input to a highway contained in another speech path unit, for example in the speech path unit 20b, the speech path control equipment (SPC) 35 in the speech path unit 20b controls the holding memory circuit 32 in the speech path unit 23b under the control of the central processing unit (CPU) 28 to establish a path shown by dot and dash lines.

In response to a control signal supplied from the central processing unit 28, a junctor holding memory circuit (JHM) 37a controls the junctor switch unit (JSU) 26a so as to establish a semipermanent connection path between speech path units. Although in the foregoing description, only the reception of the line signal from the highway 23a of the speech path unit 20a and the establishment of a one-way speech path from the highway 23a of the speech path unit 20a to the highway 23b of the speech path unit 23b were described, it should be understood that a two-way speech path can also be established.

Although the construction and operation of the junctor transfer switch (TRJ) 36 will be described hereinafter, at this stage of description it may be deemed as a through circuit.

The digital trunk circuit (DTRK-F) 34a of the speech path unit 23a generates a busy tone signal utilized at the time when a line is idle. As described above, it is possible to send this busy tone signal to any time slot on the outgoing highway 23b by connecting it via the highway 27b and a permanent path established through time switch (TSW-F) 31a and the junctor switch unit (JSU) 26a.

In this case, it is possible to send the busy tone signal by only the speech path control equipment 35 in each speech path unit 20a or 20b without awaiting the control of the central processing unit 28 thereby improving processing ability (overall efficiency) of the central processing unit 28. Since the junctor between the speech path units is semipermanently established it is possible for the speech path control equipment 35 in each speech path unit 20 to know the present junction pattern whereby the speech path connection, transmission and reception of signals, test, etc. in its speech path unit can be made readily. Accordingly, it is possible to construct not only hardware but also software as modules. Thus, when expanding the switching network capacity it is only necessary to provide additional speech path units 20 as shown in FIG. 2 just like a building block and the expansion construction test can readily be made by using the stand-by mode junctor switch unit (JSU) 26x and test unit (TSTU) 21.

It is expected that various elements shown in FIG. 3 can be integrated into a single component block (for example, one unit, one frame) when high speed operation and miniaturization become possible as a result of advances in integrated circuit techniques. With the prior art redundant structure for each apparatus, it has been necessary to increase the number of hardware circuits which are required to effect redundant switching of respective apparatus. However, by effecting redundant switching for each unit structure (speech path unit) as has been described above, the difficulty just described can be obviated.

Figure 5:
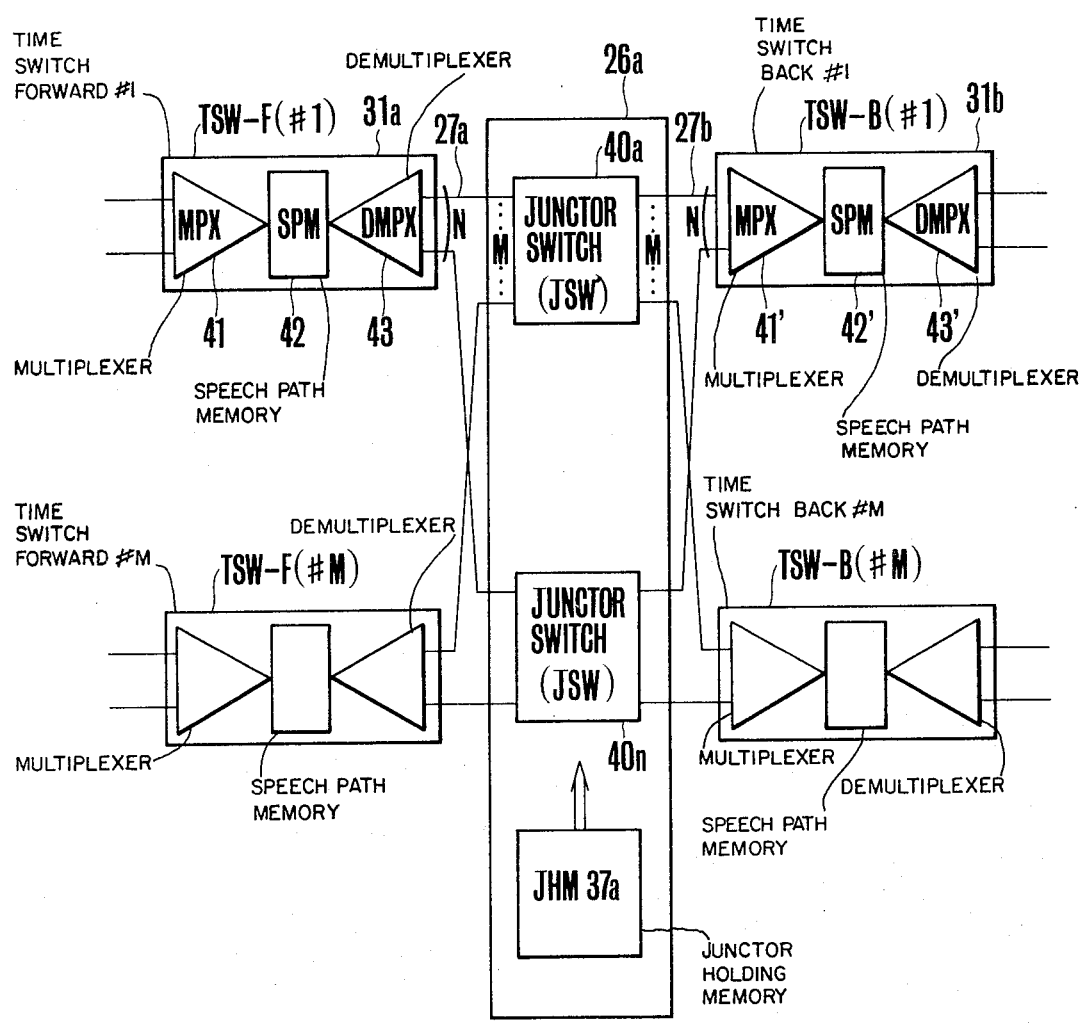
FIG. 5 is a connection diagram showing the connections between M speech path units and a junctor switch unit.

FIG. 5 shows the connection between M speech path units (SPU) and a junctor switch unit (JSU) in which time switches TSW-F and TSW-B which have been considered as being contained in a single speech path unit (SPU) are disposed on both sides of the junctor switch unit (JSU) for the purpose of facilitating the description thereof. In FIG. 5, the junctor switch unit (JSU) is constituted by N junctor switches (JSW) 40a–40n having M incoming and outgoing lines, and a junctor holding memory circuit (JHM) 37a. Each time switch (TSW-F) comprises a multiplexer circuit (MPX)

41 which multiplexes the signals from the incoming highway, a speech path memory device (SPM) 42 which stores the output signals of the multiplexer circuit 41, and a demultiplexer circuit (DMPX) 43 which distributes the output read out signals from the speech path memory device 42 on N junctor highways. The address information for the speech path memory device 42 is stored in a holding memory circuit (HM) 32 (not shown in FIG. 5) corresponding to each speech path unit (SPU). The time switch TSW-B also comprises a multiplexer 41', a demultiplexer 43', and a speech path memory device 42' which operate in the same manner as the corresponding elements of the time switch TSW-F.

With this construction, the change in the junctor pattern between junctor highways 27a and 27b can be made automatically by the junctor switch unit 26a. Moreover, it is possible to decrease the number of the junctor highways extending from one time switch by multiplexing the junctor highways 27a and 27b on a time division basis thus decreasing the number of cables and facilitating the expansion job.

The optinum number of the junctor highways extending from one time switch, is dependent upon the signal speed condition on the junctor highways, the timing allowance between the speech path unit 20 and the junctor switch unit 26, the number of the junctor switches and the volume of the hardware. This relationship will be described in the following with reference to a typical example.

For the sake of description, it is now assumed that the number (N) of the junctor switches (JSW) is 4, and that the capacity of the matrix of each junctor switch (JSW), that is the number (M) of the junctor highways connected to the time switches (TSW) 31a and 31b are 4 and 8 respectively.

Figure 6:
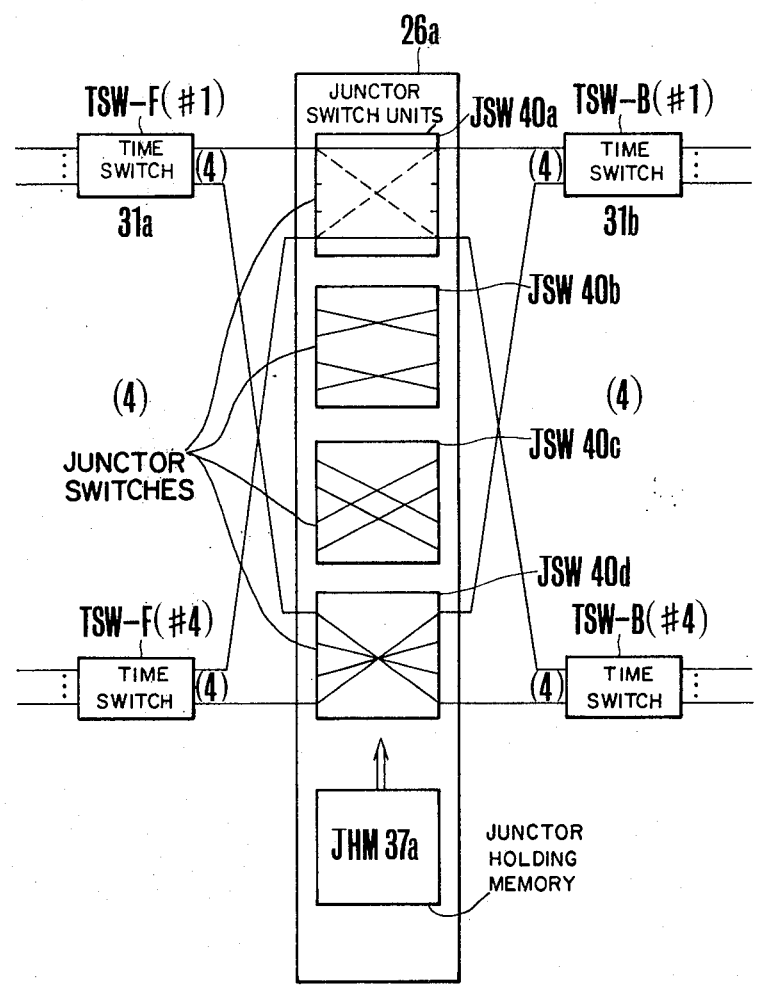
FIG. 6 is a connection diagram of the circuit shown in FIG. 5 where M=4.

FIG. 6 shows the connection of a case wherein M=4. In this case the conections of the junctor switches (JSW) 40a–40d are always fixed as shown by solid lines. More particularly, assume now that the slip between the incoming terminal of the junctor switch 40a is 0, the slip of the junctor switch 40b is 1, that of the junctor switch 40c is 2, that of the junctor switch 40d is 3. "Slip 0" means that the numbers of the incoming and outgoing sides of the junctor switch are the same. "Slip 1" means that the outgoing side terminal number is equal to the incoming side terminal number±1 of the junctor switch, "slip 2" means that the outgoing side terminal number is equal to the incoming side terminal number±2, and "slip 3" means that the outgoing side terminal number is equal to the incoming side terminal±3. In this embodiment, the incoming and outgoing terminals of the junctor switch are arranged symmetrically for the purpose of effecting so-called pair control, that is for the purpose of contolling both time switches TSW-F and TSW-B by the common holding memory (HM) 32.

The arrangement described above is called a "perfect link configuration" in which the junctor is balanced between one time switch TSW-F and the other time switch TSW-B.

Suppose now that the traffic flow between two time switches TSW-F (#1) and TSW-B (#4) increases so that one junctor highway can not convey all the traffic flow. In this case, the problem of the unbalanced traffic flow can be solved by assigning the traffic flow corresponding to certain channels to the time switches of the junctor switch JSW1, for example carrying larger traffic flow as shown by dotted lines.

The size of the junctor switch matrix is the same as the number of the time switches TSW-F and TSW-B, that is the number of the speech path units (SPU), so that such matrix can be fabricated with hardware easily. If the number of junctor highways is one time switch is 4, where the maximum number (M) of the speech path units (SPU) 20 is 16, the total number of junctor highways is 128, which is one half of that of the time switches arranged in two stages as shown in FIG. 10b pages 60 and 61 of "Communication et Electronique" No. 43, 1973, Oct. "Roseaux de connexion temporels a grande capacite". As will be described later, in FIG. 5 it is also possible to decrease the number of the hardware circuits required in the demultiplexer circuit (DMPX) 43 of the primary time switch (TSW-F) and in the multiplexer circuit (MPX) 41' of the secondary time switch (TSW-B) in comparison to the number required in the prior art.

Figure 7:
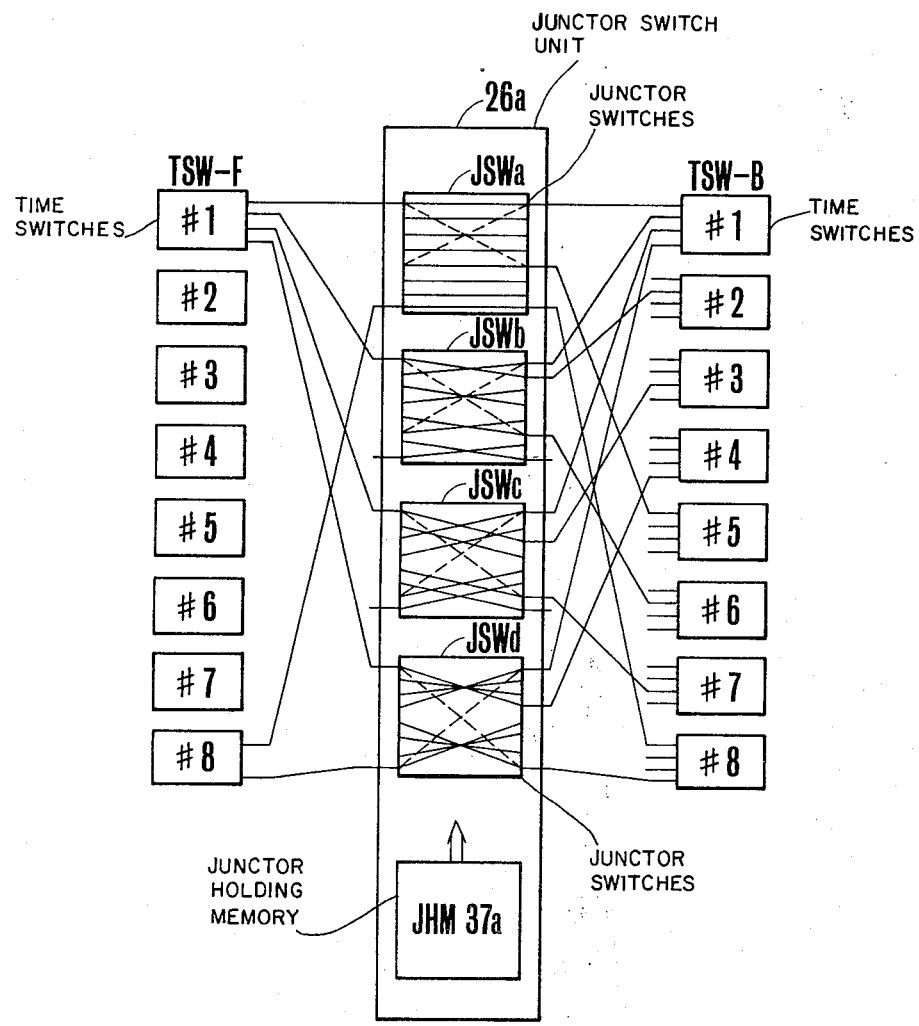
FIG. 7 is a connection diagram of the circuit shown in FIG. 5 where M=8.

FIG. 7 shows a connection where M=8. The permanent connection pattern of the junctor switches JSWa–JSWd is the same as that shown in FIG. 6 and is shown by solid lines. In this connection, the speech path from time switch TSW-F #1 can be established only to time switch TSW-B #1–#4. Thus, it is impossible to establish speech paths to #5–#8 of the time switch TSW-B. Accordingly, in this case, the connection patterns of the junctor switches JSWa–JSWd are changed as shown by dotted lines. Then it becomes possible to establish speech paths also to #5–#8 of the time switch TSW-B. Such change of the connections can be readily done by changing the content of the junctor holding memory circuit (JHM) 37a which is provided in common for the junctor switches.

Accordingly, it is possible to establish speech paths from time switch TSW-F to all time switches TSW-B by forming the connection pattern of the junctor switch JSW such that one half of the channels of one time division multiplexed frame are connected as shown by solid lines and that the other one half connected, on the time division basis, as shown by dotted lines. In this case too, it is possible to reduce the number of holding memory devices of the secondary time switches which are controlled in pairs by making symmetrical the connection pattern of the junctor switches JSW. Similar to the case shown in FIG. 6 where M=4, an increase of the traffic flow between one time switch TSW-F and specific time switch TSW-B can be accommodated by partially modifying the connection pattern of the junctor switch so as to increase the capacity of the junctor between specific time switches.

While in the foregoing description, the operation and features have been described with regard to cases where M=4 and M=8, other value of M may be selected. Furthermore, it is to be understood that instead of changing the connection pattern of the junctor time switches JSW in terms of a single channel unit, the change may be made in terms of a bundle unit of several to several tens of channels depending upon the value of M, the regulation regarding the probability of internal blocking, the assignment of the highway to time switches, the maximum capacity of the speech path network, etc. In any case, it is possible to decrease the number of holding memory devices to a fraction or only a few percent of the number required for systems of the type wherein the number of holding memory devices which define the connection pattern of the junctor switches JSW, is varied for each channel.

Change of the connection patterns of the junctor switches is necessary not only when the traffic flow becomes unbalanced but also when it is desired to expand the network, in the same manner as in conventional telephone exchanges.

In this embodiment, the junctor switches are collectively arranged, but they may be dispersed. For example, the hardware comprising the junctor switches JSW may be distributed among primary or secondary time switches. The principle of operation of such distributed arrangement is the same as that of the collective arrangement.

The construction of the junctor switches JSW is similar to that of a well known space (S) switch except that the change of the connection pattern is not necessary for the processing of ordinary calls, and that the change is made in terms of a bundle of several to several tens channel.

Change of the junctor pattern also is required when it becomes necessary to transfer to a stand-by speech path unit (SPU) 20x upon occurrence of a failure of a certain speech path unit 20. As above described since the change of the junctor pattern is made in terms of a bundle of several to several tens of channels, it is possible to decrease the data writing operations for the junctor holding memory device (JHM) 37a to a fraction, thus enabling rapid remedy of the fault.

Figure 8:
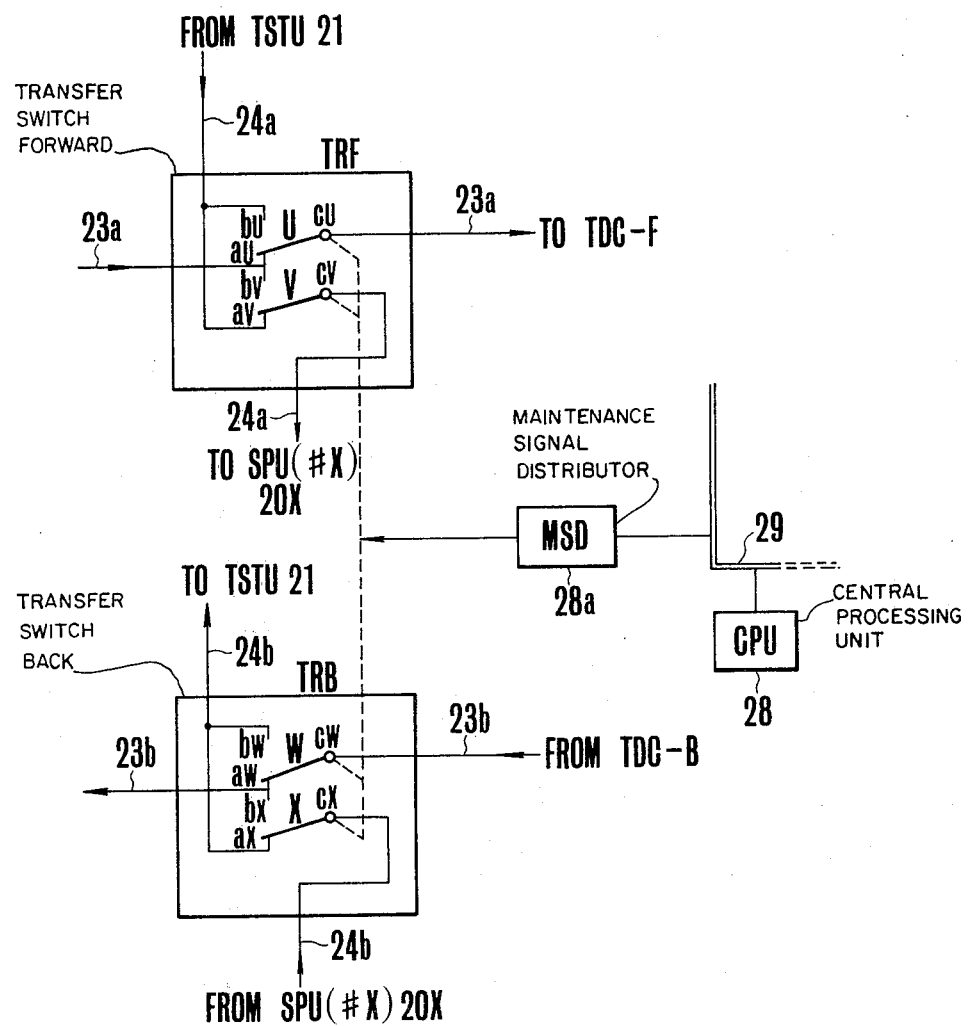
FIG. 8 is a connection diagram of a changeover switch for explaining a redundant changeover performance.

The redundant switching performance of the speech path unit SPU, that is the operation of the incoming transfer switch TRF and the outgoing transfer switch TRB will be described hereunder with reference to FIG. 8. More particularly, the incoming transfer switch TRF comprises two transfer switches U and V with the stationary contacts thereof on the opposite sides (upper and low sides) connected together. To the stationary contacts au and bv is connected an input highway 23a from the synchronizing circuit SYNC or the CODEC, whereas a maintainance outgoing highway 24a from test unit (TSTU) 21 is connected to the stationary contacts bu and av. The movable contact cu of the transfer switch U is connected to the forward time division speech path connecting equipment TDC-F of a speech path unit through a highway 23a, whereas the movable contact cv of the transfer switch V is connected to the incoming transfer switch TRF of the next stage or to a stand-by or spare mode speech path unit 20x.

Similarly, the outgoing transfer switch TRB comprises two transfer switches W and X with their stationary contacts on the opposite sides connected together. The stationary contacts bw and ax are connected to the test unit (TSTU) 21 via the maintainance incoming highway 24b, while the stationary contacts aw and bx are connected to an outgoing highway 23b leading to the synchronizing circuit SYNC or the CODEC. The movable contact cw of the transfer switch W is connected to the highway 23b from the backward time division speech path connecting equipment TDC-B of a speech path unit SPU, whereas the movable contact cx of the transfer switch X is connected to the highway 24b from another outgoing transfer switch TRB or a stand-by speech path unit SPU 20x. These incoming and outgoing transfer switches TRF and TRB are paired for respective speech path units (SPU), and the paired transfer switches U, V, W and X are transfered by a signal from the central processing unit (CPU) 28 via maintenance signal distributor (MSD) 28a. These transfer switches may be mechanical or electric switches.

Figure 9A:
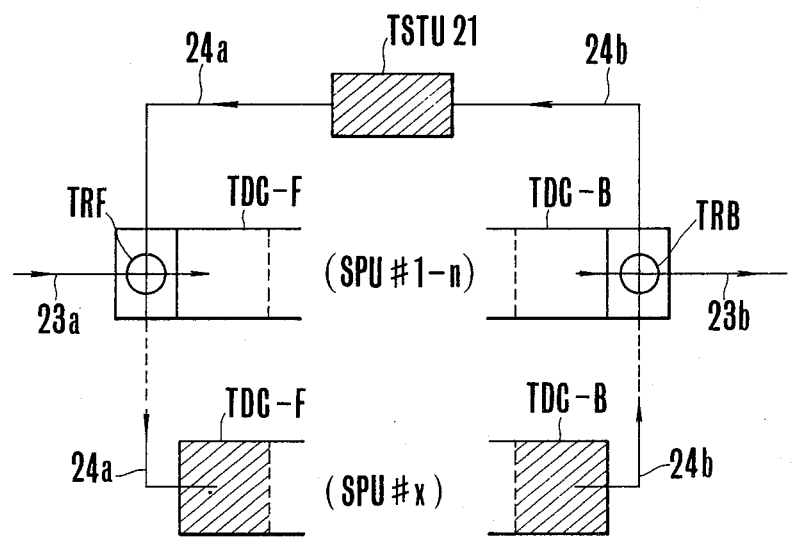
FIG. 9A and 9B are connection diagrams for explaining the redundant changeover performance of the changeover switch shown in FIG. 8.

The operations of the incoming and outgoing transfer switches TRF and TRB will be described hereunder with reference to FIGS. 2, 9A and 9B.

Assume now that all transfer switches TRF shown in FIG. 2 are thrown to the side "a" and that all speech path units #1–#n are operating normally. Under these conditions, the incoming transfer switch TRF establishes a path which interconnect the input highway 23a and the forwad time division speech path connecting equipment TDC-F of the speech path unit and a path which interconnects the test unit (TSTU) 21 and a stand-by speech path unit 20x. The outgoing transfer switch TRB establishes a path which interconnects the backward time division speech path connecting equipment TDC-B of the speech path unit and the outgoing highway 23b and a path interconnecting the stand-by speech path unit 20x and the test unit (TSTU) 21. Consequently, the incoming and outgoing highways, the CODEC and the synchronizing circuit SYNC, not shown, the forward and backward time division speech path connecting equipments TDC-F, TDC-B, the test unit (TSTU) 21 and the stand-by speech path unit 20x are interconnected. These states are diagrammatically represented by FIG. 9A. Accordingly, in this case, the test unit 21 performs the validity check of the stand-by speech path unit 20x. In FIGS. 9A and 9B shaded blocks represent elements under test.

Figure 9B:
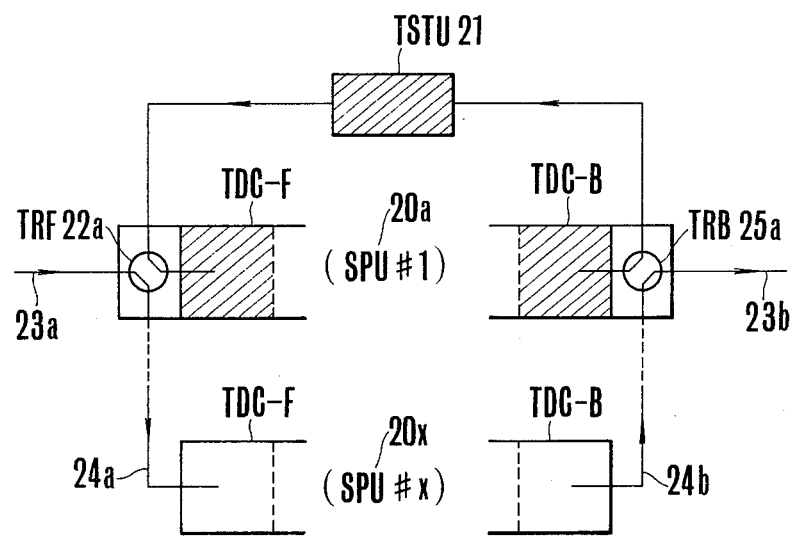

As seen in FIG. 9B, when a fault occurs on a #1 speech path unit 20a, for example, so that the transfer switches (TRF) 22a and (TRB) 25a on their incoming and outgoing sides are thrown to contact "b", the TDC-F and TDC-B of #1 speech path unit 20a are connected to the test unit (TSTU) 21 whereas the incoming and outgoing highways 23a and 23b are connected to the #x stand-by speech path unit 20x through maintainance highways 24a and 24b. Thus, the test unit 21 tests the faulty #1 speech path unit 20a to locate the faulty point by checking the received and transmitted signals or by using other measures, and informs the test result to the central processing unit.

Figure 10:
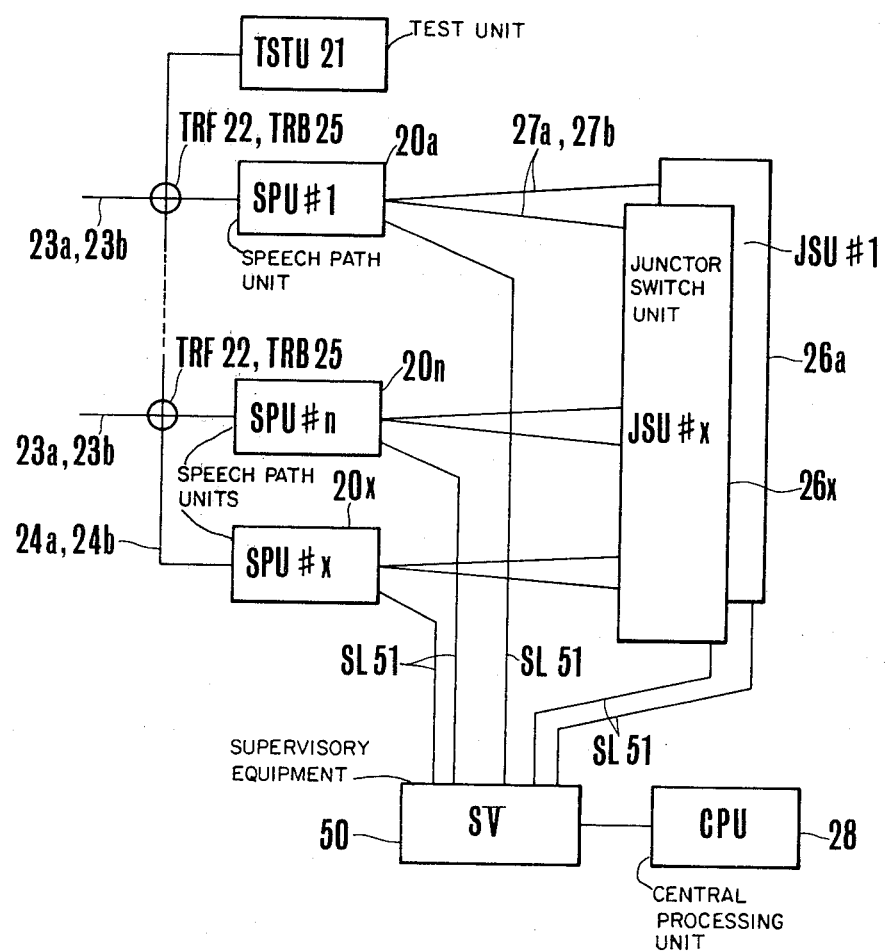
FIG. 10 is a block diagram showing a modified embodiment of this invention incorporated with a fault supervisory device.

FIG. 10 shows a modified embodiment of the digital telephone switching system of this invention which is constructed to promptly detect a faulty equipment, and to execute processing of the transfer to the stand-by equipment thereby continuing the switching operation. The embodiment shown in FIG. 10 comprises a supervisory equipment (SV) 50 and supervisory information lines (SL) 51 which interconnect the supervisory equipment 50 and respective speech path units 20a–20n and 20x. When such important and common fault as, for example, the fault of the power circuit, a fault of the clock signal source and a fault of the control information distributing circuit occurs in the speech path unit or the junctor switch units (JSU) 26a and 26b, a signal representing such fault is sent to the supervisory equipment 50 through the supervisory lines 51. The number of the supervisory lines (SL) 51 which interconnect the speech path units and the supervisory equipment is made a minimum. The supervisory equipment 50 promptly informs the central processing unit 28 of the fault according to the content of the supervisory lines 51. As an expedient to informing the CPU 28 of a fault by the supervisory equipment 50 the central processing unit 28 may be programmed to perform a periodical looking-in operation by the central processing unit 28 or to cause a forced interruption by the supervisory equipment 50. Which one of the expedients is to be used is determined by considering the required service grade, service quality, etc.

Figure 11:
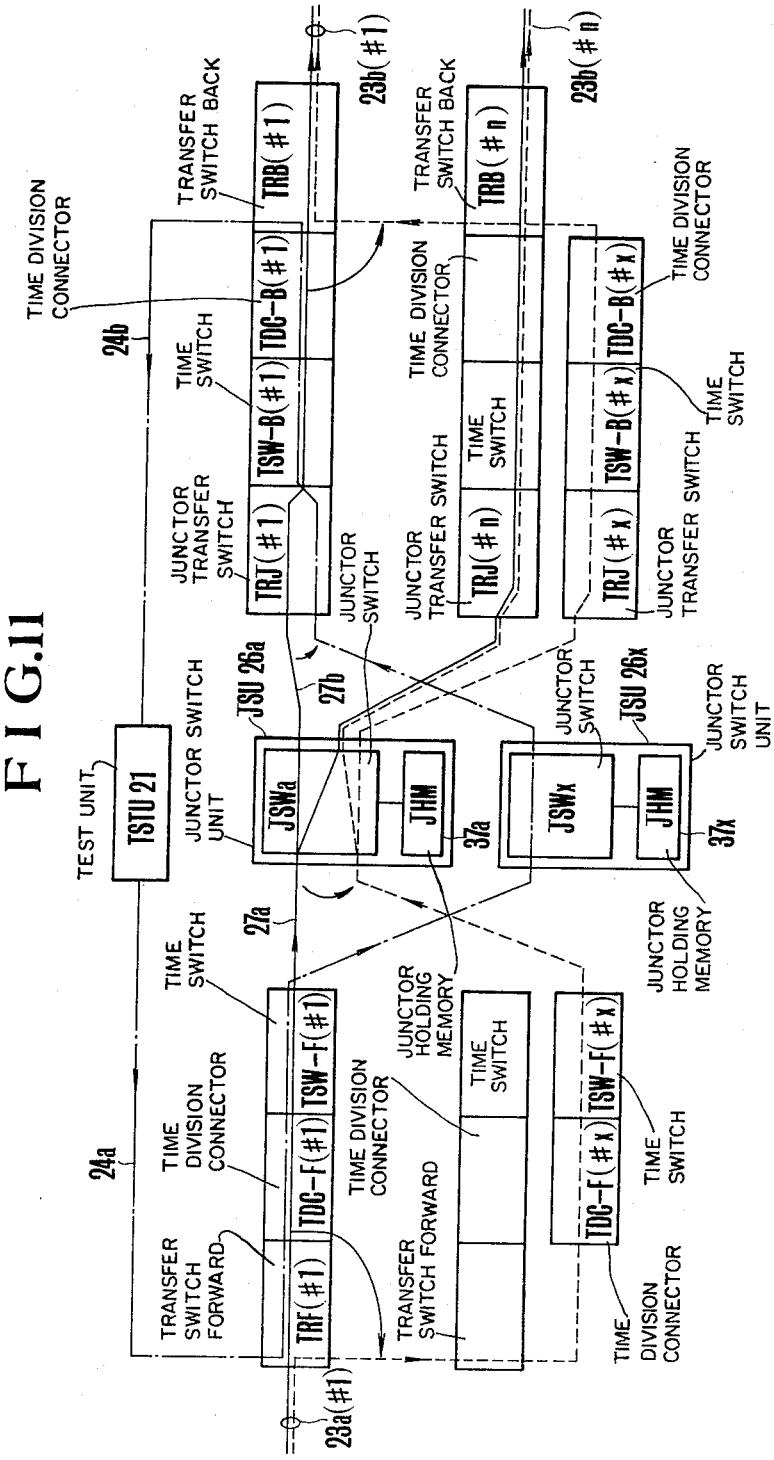
FIG. 11 is a block diagram useful to explain a redundant changeover performance and the operation of the junctor switch unit.

The operation of the junctor switch unit JSU will be described hereunder with reference to FIG. 11. It should be remembered that the function of the junctor switch unit JSU is to control the junctor performance between the time switches TSW in a plurality of speech path units (SPU). Thus, the junctor switch unit is operated when the network is to be expanded due to the addition of the speech path units, or when a fault occurs on a speech path unit or when a transfer connecting the incoming and outgoing highways 23a and 23b of a specific speech path unit SPU to the #x stand-by speech path unit 20x is required. The junctor switch unit JSU 26a is constituted by a plurality of time division junctor switches (JSW) (only JSWa is shown) and a junctor switch holding memory circuit (JHM) 37a which commonly controls the plurality of time division junctor switches (JSW). The system shown in FIG. 11 is duplicated by providing two systems 26a and 26x of the junctor switch unit JSU constructed as above described.

The transfer operations of the junctor switch unit when a fault occurs are as follows. Assume a transfer operation by which a signal on the #1 highway 23a of the #1 speech path unit 20a is transferred to the #1 highway 23b and the #n highway 23b of speech path units 20a and 20n is transferred, as shown by solid lines. Due to the fault of the speech path unit 20a when #x standby speech path unit 20x is used to perform the switching operation, under the control of the central processing unit, and the status of the transfer switches TRF, TRB and of the junctor holding memory circuit (JHM) 37a of the time division junctor switch JSWa are changed. Such status changes are made, under the control of the central control unit (CPU), to transfer the #1 transfer switches TRF and TRB to the #n speech path unit 20x for setting the status of the time switch TSW and the digital trunk circuit DTRK in the #x speech path unit 20x similar to the status in the #1 speech path unit 20a thereby transferring the content of the junctor holding memory circuit (JHM) 37a to the #x speech path unit 20x from the #1 speech path unit 20a. Consequently, it is possible to assure normal transfer operation even when #1 speech path unit (SPU) 20a becomes faulty. When the #1 TRF, JHM 37x, #1 TRJ and #1 TRB are set as shown in FIG. 11 so as to pass a test current to the #1 faulty speech path unit 20a through a dot and dash line path from the test unit 21, it is possible to locate the fault position in the #1 speech path unit 20a and to isolate the faulty speech path unit from the line without interfering the normal switching operation.

The junctor transfer switch TRJ is connected in each speech path unit in front of the time switch TSW-B, thereby selecting a junctor switch unit JSU 26a or JSU 26x by the speech path control equipment SPC in each speech path unit SPU. In this manner, since the junctor switch JSWa of JSU 26a or the junctor switch JSWx of JSU 26x is selectively connected to each speech path unit SPU it is possible to independently use the junctor switch JSW for an on-line system and an off-line system thus preventing the fault test from adversely effecting the normal system.

Since the junctor transfer switch TRJ selects either JSU 26a or JSU 26x of each speech path unit, even when the junctor transfer switch TRJ of a specific speech path unit becomes faulty, the fault would be limited to only the specific speech path unit whereby there is no adverse effect upon the entire transfer system. If the junctor transfer switches TRJ were collectively installed in an junctor switch unit, for example, the fault in that TRJ would affect the entire transfer system which is of course objectional.

Figure 12:
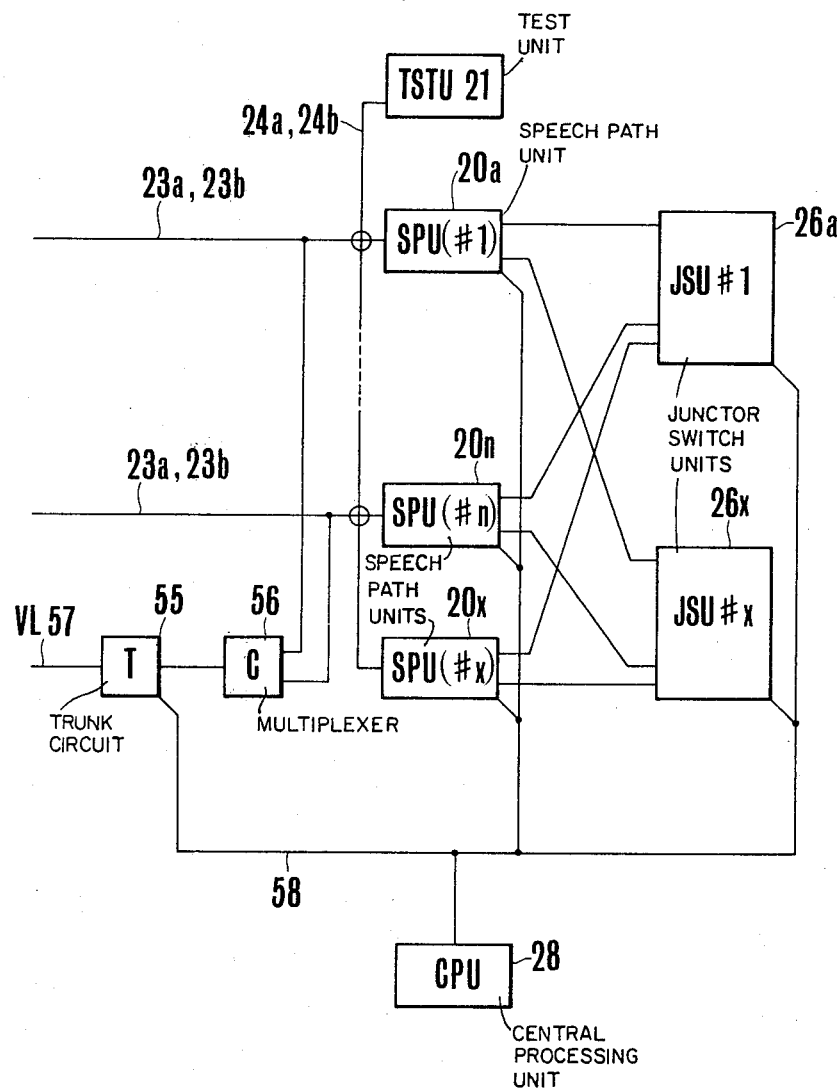
FIG. 12 is a connection diagram showing a modified embodiment of this invention wherein voice frequency line signals are transmitted.

FIG. 12 shows still further modification of this invention which is especially suitable for a situation where the incoming and outgoing lines of a time division telephone switching system are not limited time division multiplexed highways but include lines for transmitting voice signals and inter-office connection signals without varying them. The system comprises a trunk circuit 55, a CODEC 56, and a voice signal line (VL) 57. The voice signal comprises a signal exchanged between telephone exchange offices, and a analogue voice signal before it is converted into a digital multiplexed signal, so that it is impossible to directly connect the voice signal line (VL) 57 to the speech path unit SPU and the central processing unit 28. Accordingly, it is necessary to extract, insert and convert these signals with the trunk circuit (T) 55 and the CODEC (c) 56. The trunk circuit 55 is idential to that utilized in conventional space division type electric switching systems and is connected to the central processing unit 28 via line 58 for supervising the status of speech (busy or idle). In addition to the transmission and reception of the dial pulse in the form of interrupted or inverted direct current, the trunk circuit performs a portion of the processing of various signals which have been performed by the central processing unit 28. The purpose of CODEC 56 is to convert analogue voice signals into digital multiplexed signals with the same multiplicity and the same signal speed as the incoming and outgoing highways 23a and 23b of each speech path unit. The multi-frequency signals interchanged between offices are converted into digital signals by CODEC 56 and then transmitted and received through digital trunk circuit DTRK in a given speech path unit.

As above described, by connecting the signal on the voice frequency line 57 to a speech path unit SPU and to the central processing unit 28 it is possible to efficiently process the transfer operation, just like the other embodiments, even where the lines connected to the time division telephone switching system include voice band lines in addition to multiplexed highways.

Figure 13:
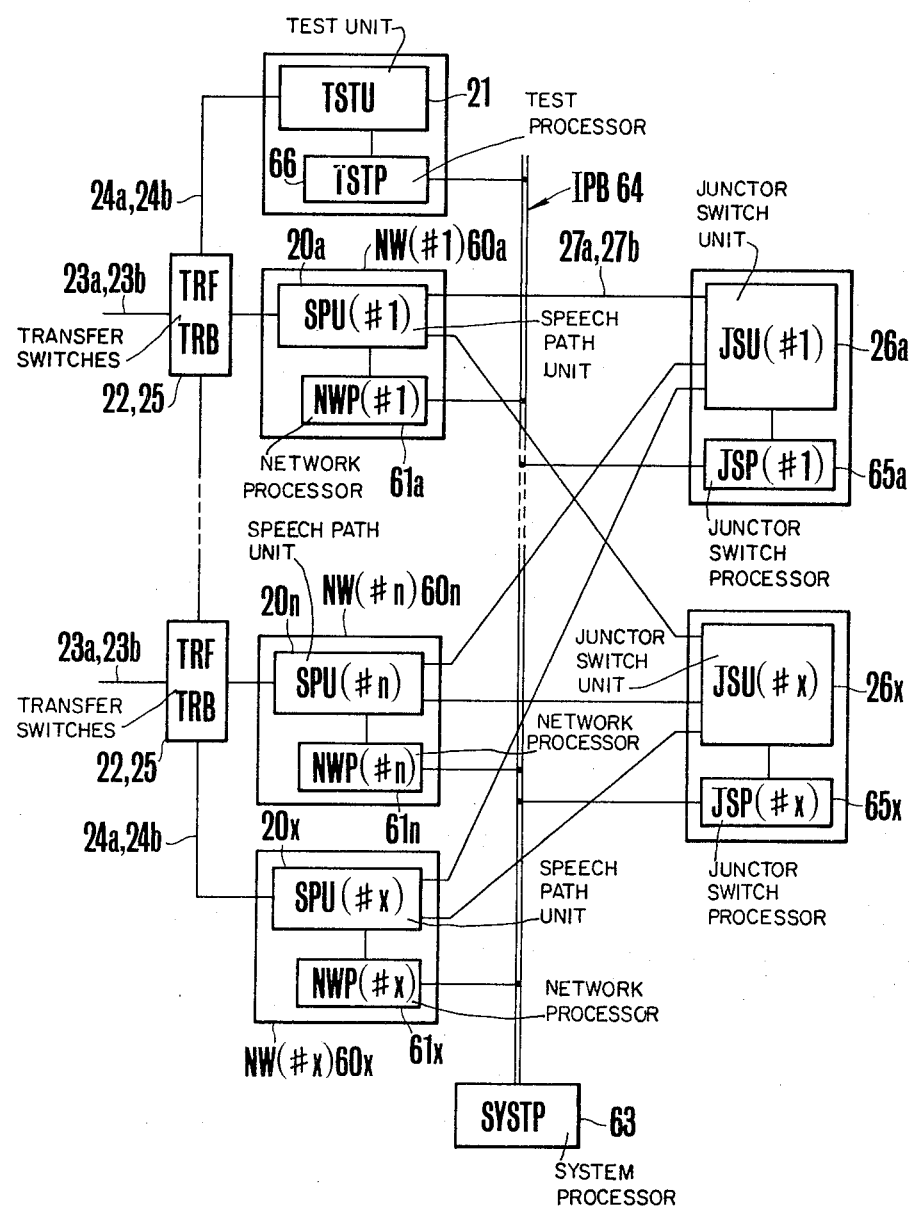
FIG. 13 is a block diagram showing still another embodiment of this invention in which processors are distributed among speech path units, junctor switch units, etc.

FIG. 13 shows still further embodiment of this invention in which processors are provided corresponding to respective speech path units 20a–20n, 20x, test unit (TSTU) 21, and junctor switch units (JSU) 26a and 26x so that the processing of the time switches TSW in the speech path units 20a–20n, 20x and the digital trunk circuit DTRK are independently performed by network processors (NWP) 61a–61n, 61x respectively as a consequence only the processings involving the plurality of networks 60a–60n, 60x, for example, the connection processing between different networks NW, the test processing, and the processing of the junctor connection patterns at the time of expanding the network NW, the communication between other network processors NWP, or junctor switch processors (JPS) 65a, 65x, or system processors SYSP 63, is executed an interprocessor bus line (IPB) 64, under the supervision of the system processor (SYSP) 63 which contains common data that is referred to if necessary. The test unit (TSTU) 21 is controlled by a test processor TSTP 66 in the same manner as by the speech path unit SPU.

As above described, the network processor (NWP) 61, test processor (TSTP) 66, junctor switch processor (JSP) 65 are distributed among the speech path units SPU, test units TSTU, and junctor switch units JSU which are the objects to be controlled. On the other hand, the processing of basic exchange is performed by network processor NWP, test processor TSTP, and junctor switch processor JSP. As has been described in connection with the embodiment shown in FIG. 5 it is possible to reduce the amount of communication between respective processors since the entire speech path construction is simple and since any change of the connection pattern corresponding to a call of a junctor switch is not necessary. By distributing the network processor NWP in the above described manner, even when a plurality of faults occur at the same time, the operation of the entire exchange office would not stop thus assuring high reliability of the communication network.

It will be noted that in the descriptions and drawings referred to hereinabove, the highways 23a, 23b, 27a, 27b, 24a, 24b, and voice frequency line (VL) 57 were treated as single lines respectively. In practice, however, they are provided in plural, the number thereof being determined in accordance with the multiplicity of the signals passing through the highways, the operating speed of such component elements as memory devices that constitute the time switches TSW, the maximum desired capacity of the network, and the number of the speech path units.

The accessing time characteristics of the time switch constituting a speech path unit SPU can be illustrated as follows. Where each voice channel comprises 8 bits, for example, and where 8 buffer memory devices are used which store voice signals and are connected in parallel for the purpose of decreasing the operating speed of the memory elements utilized, the access speed to each memory element is reduced to $\frac{1}{8}$.

Figure 14:
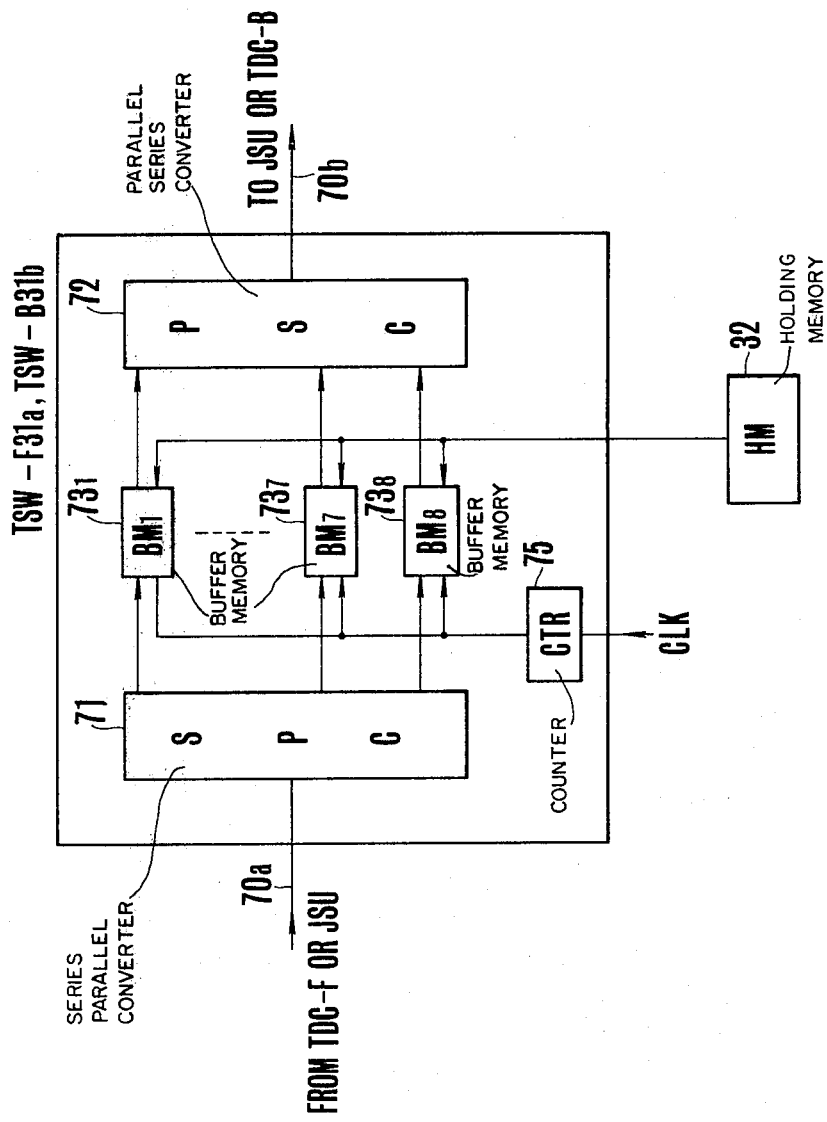
FIG. 14 is a block diagram showing the detailed construction of the time switch.

FIG. 14 shows the construction of a parallel connected time switch a described in the preceeding paragraph. The time switch comprises incoming and outgoing highways 70a and 70b respectively multiplexed in K channels, a serial-parallel converter (SPC) 71 which converts the signals on the incoming highway 70a into 8 bit parallel signals, a parallel-serial converter (PSC) 72 which converts the 8 bit parallel signals into signals supplied to the outgoing highway 70b, buffer memory devices $73_1$-$73_8$ which store digitalized voice frequency signals arriving over the incoming highway 70a, and a counter (CTR) 75. It is well known that the signal speed on the incoming highway 70a multiplexed into K channels is K×64 Kb/s in the case of an ordinary 8 bit encoded PCM signals. Thus for example, where the value of K is equal to 128, the speed of the signal on the incoming highway 70a is equal to 8.192 Mb/s. The writing and reading out of the time switch TSW are performed alternately by the counter CTR 75 and the holding memory (HM) 32 so as to perform timed exchange. When this switch is constructed since shown in FIG. 14, as it is possible to decrease the signal speed on the incoming highway 70a to $\frac{1}{8}$ by the serial-parallel converter (SPC) 71, the signal speed supplied to the buffer memory devices $73_1$ through $73_8$ is decreased to 1.024 Mb/s. Due to the principle of operation of the time switch the sequential writing by the counter (CTR) 75 and the random read out by the holding memory device (HM) 32 are repeated alternately and the operating speed of the buffer memory device BM increased to twice 1.024 Mb/s.

According to a still further modification of this invention a buffer memory device, for example $BM_1$ shown in FIG. 14, is divided into a plurality of blocks so as to simultaneously effect the sequential writing or reading out for the plurality of blocks, thus decreasing the necessary speed of the buffer memory device to about one half of the speed described above. If desired, the order of writing and reading out of the buffer memory device may be reversed for effecting the read write operation. In the following description both modes will be described.

Figure 15:
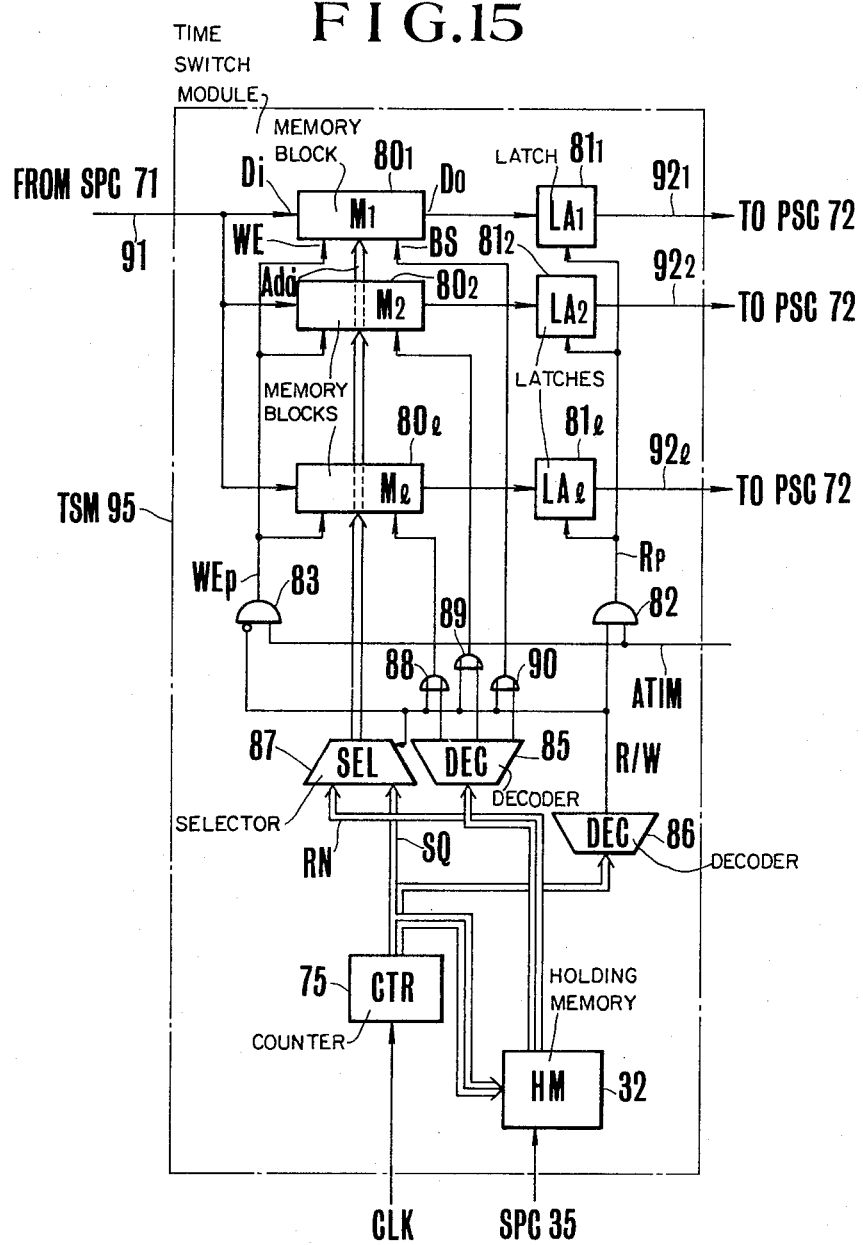
FIG. 15 is a block diagram showing still another modification of this invention in which the buffer memory shown in FIG. 14 is divided further.

FIG. 15 shows one example of such time switch, where the entire system is termed a "time switch module TSM 95". In FIG. 15, elements corresponding to those shown in FIG. 14 are designated by the same reference characters. Elements $80_1, 80_2 \ldots 80_l$ are memory blocks M obtained by dividing a buffer memory device, for example $BM_1$, shown in FIG. 14. Each block is provided with a data input terminal Di, a data output terminal Do, an address input terminal Add, a write enable terminal WE, and a block selection terminal BS. Reference characters $81_1$-$81_l$ represent latch circuits (LA) connected to the output terminals Do of respective memory blocks 80, through 80l, 82 represents an AND gate circuit, 83 an inhibit gate circuit, 85 and 86 decoders (DEC), 87 a selector circuit (SEL) and 88-90 OR gate circuits, and ATIM is a signal that designates the pulse widths of WEp and Rp. Usually, this signal is applied at a definite period.

Figure 16:
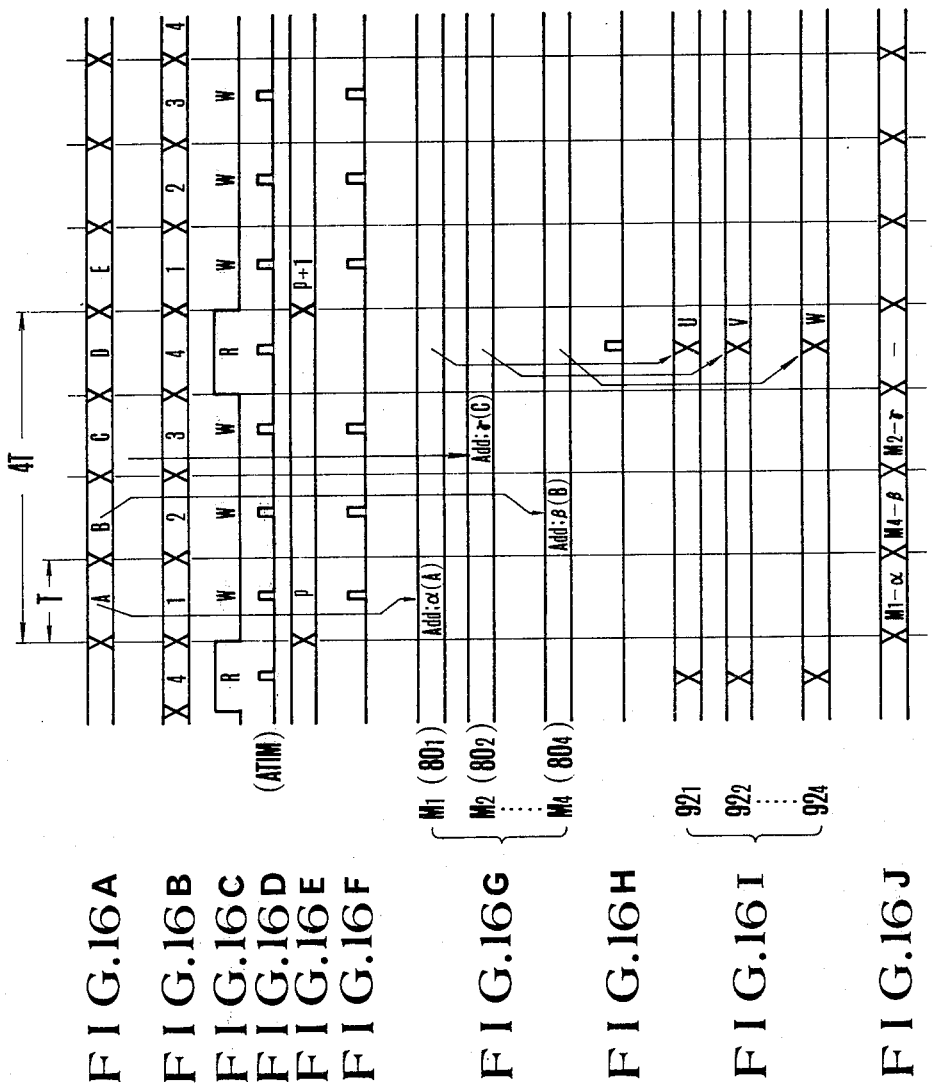
FIG. 16(A-J) is a timing chart useful to explain the operation of the time switch module shown in FIG. 15.

The operation of the system shown in FIG. 15 will now be described with reference to FIGS. 16A–16J, wherein FIG. 16A shows the status of the signals on incoming highway 91 supplied from a SPC 71 wherein T represents the width of one time slot of this highway and A, B, C, D, and E represent the contents of respective time signals on incoming highway 91. FIG. 16B represents the content of the counter 75, especially the count of the lower order bit. FIG. 16C show a read/write (R/W) signal produced by decoder 86 in accordance with the output of counter 75 in which R represent a read out cycle while W a writing cycle. FIG. 16D represents the timing of memory access. FIG. 16E represents the sequential addresses SQ formed by the upper order bits of the output of the counter 75 in which P, P+1 in the waveform show an address common to all memory blocks. FIG. 16F shows a series of write pulses whereas FIG. 16G shows the processing of the memory blocks M1–M4 wherein symbols Add:$\alpha$(A), Add:$\beta$(B) mean that addresses are $\alpha$ and $\beta$ and their contents are A and B, respectively. Further, FIG. 16H shows the waveform of a read out pulse Rp; FIG. 16I shows the waveforms on the outgoing highways $92_1$-$92_l$ of the latch circuits $81_1$-$81_l$ and FIG. 16J represents a random address sent from the holding memory device (HM) 32 in which the symbol, for example, M1-$\alpha$ designates the address $\alpha$ of the memory block (M1) $80_1$.

As can be noted from FIGS. 16A–16J, l=4. Let us assume that the signal sent from the speech path control equipment (SPC) 71 is quadruplexed. In this case the lower order bit corresponding to the output 1 of the counter 75, that is log$_2$ l bits (2 bits, since l=4 in FIG. 16), are decoded by the decoder 86, and one of the resulting outputs is used as the R/W signal (in FIG. 16, corresponding to a case where the count of lower two bits is 4), and the information (the information D, in the case of FIG. 16A) of a time slot corresponding to the position R where the output of the decoder 86 is "1" is neglected. Then the time slot is assigned to the read out timing (generally speaking a sequential access timing).

The information on the incoming highway 91 is written in the memory block at a position WEp shown in FIG. 16F with the write timing W (W side of the waveform R/W) shown in FIG. 16C thus selecting the address of the holding memory device 32 by the selector 87. This is generally called a random address RN and the upper order bits thereof are decoded by decoder 85. In a case where l=4, the output signal of the decoder 85 appears on only one of 4 output terminals. This output signal corresponds to a block select BS of respective memory devices. Accordingly, the R/W signal applied to one input of the OR gate citcuits 88–90 is "0" so that only one BS terminal of four memory blocks is designated and writes data in the designated address above of the memory block. This is shown by an arrow from FIG. 16A to FIG. 16G and the information "A" on the incoming highway 91 is written in address α of the memory block $80_1$. As a consequence the content of address α becomes "A" whereas "B" is written into the address β of the memory block (M4) $80_4$ (in FIG. 15 l=4) so that the content of address β becomes "B".

One negligible time slot appears, at each 4 time slots as above described, on the information train supplied through the incoming highway 71 which is synchronous with the common clock signal CLK (in FIG. 16B, at a position where the count of the lower 2 bits of the conter 75 is 4). No writing operation is necessary for this negligible time slot (information D shown in FIG. 16A). Since this timing position is decoded by the decoder 86 and used as a read out timing, this time position, that is the count 4 of the lower two bits of the counter 75 is decoded by the decoder 86 to produce a R/W equal (shown in FIG. 16C) on its output. When this R/W signal becomes "1" the selector 87 selects a SQ side address (P shown in FIG. 16E) common to the memory blocks M1–M4 thus rendering one inputs of the OR gate circuits to become "1". Thus, the RS of respective memory block becomes "1" (not caused by the output of the decoder 85). Accordingly, the outputs of all memory blocks become effective, and as shown by an arrow extending from FIG. 16G to FIG. 16I, and outputs of these memory blocks (contents of the addresses P of blocks M1 through M4) are applied to the latch circuits $81_1$–$81_4$ and held therein by the read out pulse Rp shown in FIG. 16H.

By the operation described above it is possible to parallely read out a plurality of memory blocks with a single read out pulse Rp thus independently applying the read out data to four 1/4 multiplexed outgoing highways $92_1$–$92_4$. Moreover, there is an advantage that the access time per one frame length of the memory device can be decreased to l from conventional length 2l.

As has been pointed out hereinabove, the information on the incoming highway is neglected once per times. But this does not present any trouble for the following.

Figure 17:
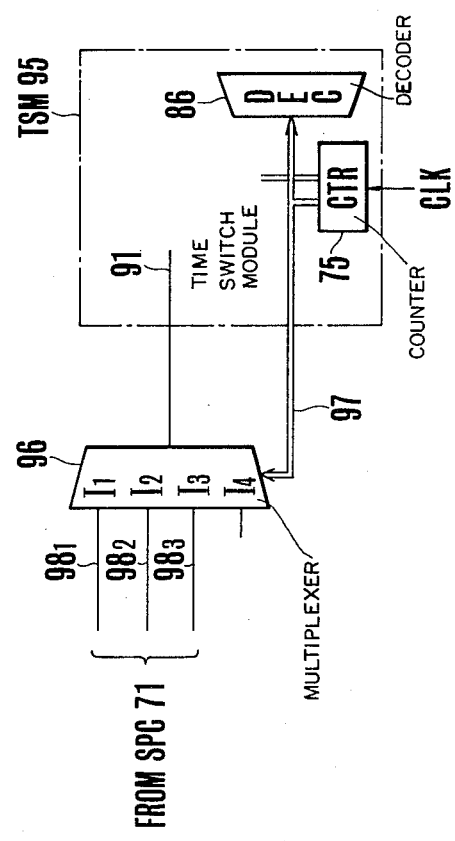
FIG. 17 is a block diagram showing a modification of the system shown in FIG. 15.

FIG. 17 is a drawing to supplement the description regarding the neglected time slot in which l=4. Time switch module (TSM) 95 has the same construction as that shown in FIG. 15 except that l=4, and 96 designates a multiplexing circuit (MPX) connected to the input side of the incoming highway 91. The multiplexer 96 is supplied with the lower two bits of the output of the counter 75 in the TSM 95 via control line 97. The numbers of the input terminals I1–I4 of the multiplexer 96 directly correspond to the content of the control line 97 which selects these inputs. The lines $98_1$–$98_3$ connected to the input terminals I1–I3 are PCM highways having low order of multiplicity K/1 (where K=4).

Since no highway having a low order of multiplicity is connected to the input terminal I4 of the multiplexer 96, its output can be used for other purposes. For example, assume the data train for the incoming highway 91 is selected from input terminal I1 when the content of the control line 97 is one, whereby the data on the highway 98, of the low order of multiplicity appears on the incoming highway 91. When the content on the control line 97 is two the input terminal I2 is selected so that the data on the highway $98_2$ of the low order multiplicity appears on the incoming highway. When the content of the control line 97 is three, the data on the highway $98_3$ of low order multiplicity appears on the incoming highway 91. However, when the content of the control line is four the input terminal I4 will be selected and the data on the incoming highway 91 has no meaning. Nevertheless, any effective data slot would not be lost even when such data (the time slot on the highway 91) is neglected. This is due to the fact that the content of the control line 97 comprises the lower two bits of the output of the counter 75 in the TSM 95, and that is equal to the input information of the decoder 86 in the TSM 95. By making the output (in the example shown in FIG. 16, 4) of the decoder 86 to correspond to the number of the input terminal (I4 in the case shown in FIG. 17) which is not connected to a highway of the lower order of multiplicity of the multiplexer 96 it is possible to make the negligible time slot on the incoming highway 91 to correspond to a time slot to be neglected (assigned to a read out timing, more particularly a sequential access timing).

The number of the neglected time slots is K/l per one frame and in order to decrease the number of the neglected time slots, number of the memory blocks l is increased. Where a spare access timing is necessary to test speech paths, the number of the neglected time slots is increased.

Figure 18:
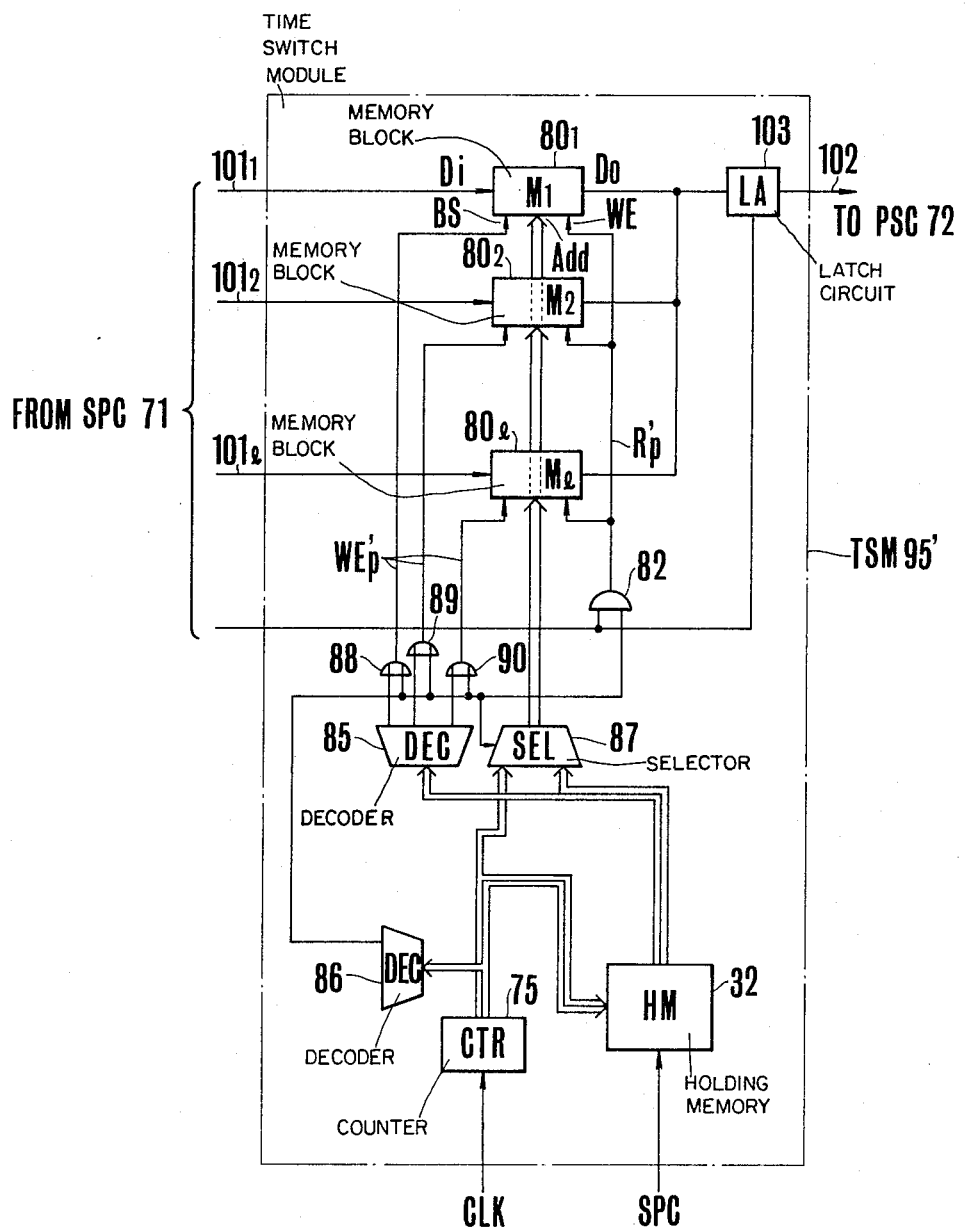
FIG. 18 is a block diagram showing still further modification of the system shown in FIG. 15.

Although in the embodiment shown in FIG. 15, the read out side is sequentially accessed, if desired the write side can be sequentially accessed. FIG. 18 shows an example of the latter case in the form of a time switch module (TSM) 95'. This modification comprises incoming highways 101–101 l which respectively receive the parallel output from the speech path control equipment (SPC) 71, an outgoing highway 102 which sends an output to PSC 72, and a latch circuit (LA) 103 for holding the outputs of memory blocks $80_1$ through $80_l$. R'p represents a read out pulse line on which a read out pulse appears ceases once per l times just like the write pulse WEp shown in FIG. 16E. WE'p represents a write pulse line on which a write pulse is generated per l times like the read out pulses Rp shown in FIG. 16F. Other reference characters have same meanings as shown in FIG. 15.

Figure 19:
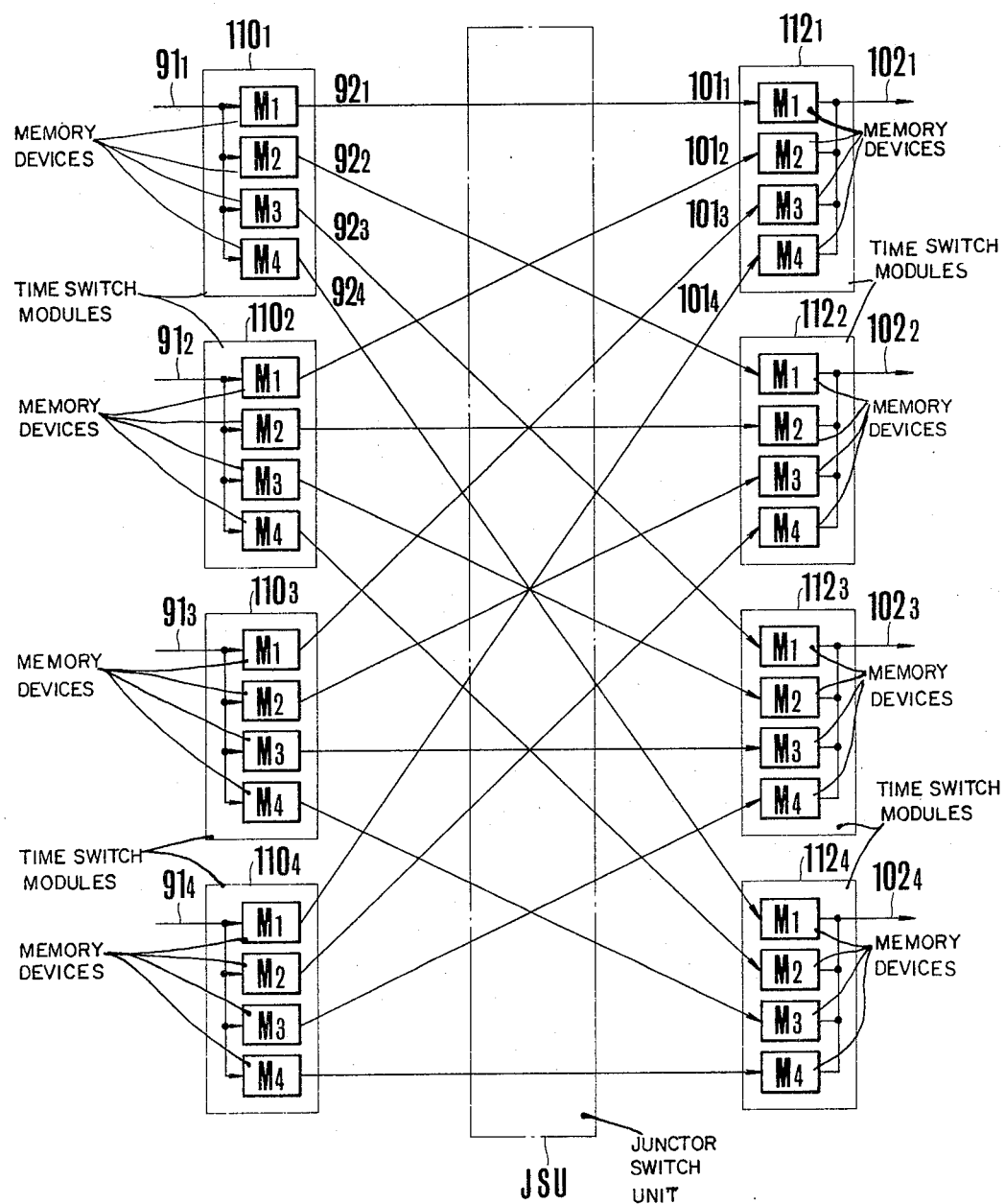
FIG. 19 is a connection diagram in which two stage time switches are constructed by dividing the time switch memory shown in FIGS. 15 and 18.

FIG. 19 shows a time division switching network of two stage construction utilizing a time switch module TSM shown in FIG. 15 or FIG. 18. In FIG. 19, elements $110_1$ through $110_4$ have the same construction as the time switch module 95 shown in FIG. 15. Each of these elements comprises four memory devices M1 through M4, whereas elements $112_1$ through $112_4$ have the same construction as the time switch module 95' shown in FIG. 18. Each one of these elements comprises four memory devices M1–M4. The detail of the memory devices are not shown. With this construction, since the number of the junctor highways between the primary and secondary time switches is equal to the number of the memory blocks of the primary and secondary time switches it is possible to construct the junctor between the primary and secondary time switches without the need for adding new circuits. In FIG. 19, the junctor switch unit JSU shown in FIG. 2 is show by dotted line, so that theoretically, the junctors are provided as shown in FIG. 19.

Figure 20:
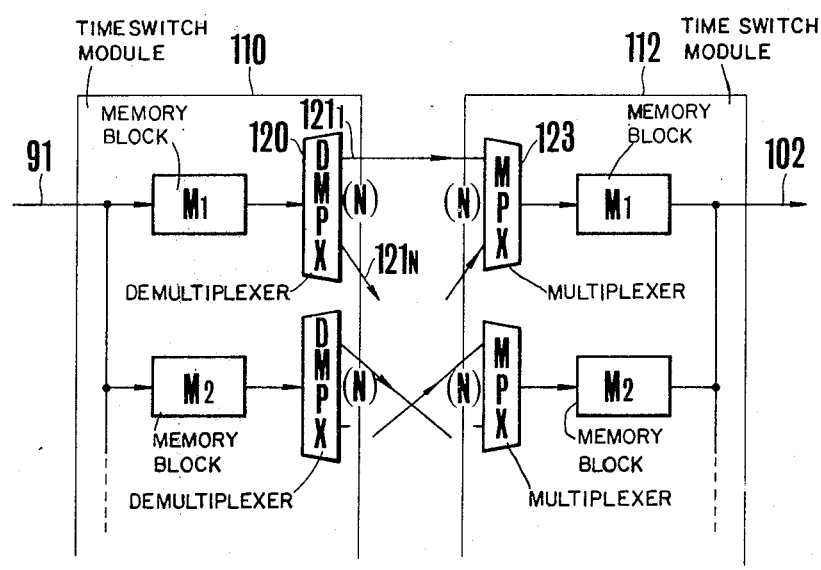
FIGS. 20, 21, 22 and 23 are connection diagrams respectively showing various modifications of the system shown in FIG. 19.

FIG. 20 shows a further modification of the system shown in FIG. 19 in which the number of the memory blocks M1, M2 is reduced to 1/N of the number of the junctor highways and a demultiplexer (DMPX) 120 which divides one highway into a plurality of highways $121_1$–$121_N$ is provided on the outside of the primary time switch 110. The divided highways are multiplexed into a single highway by a multiplexer (MPX) 123 provided on the input side of the secondary time switch.

Figure 21:
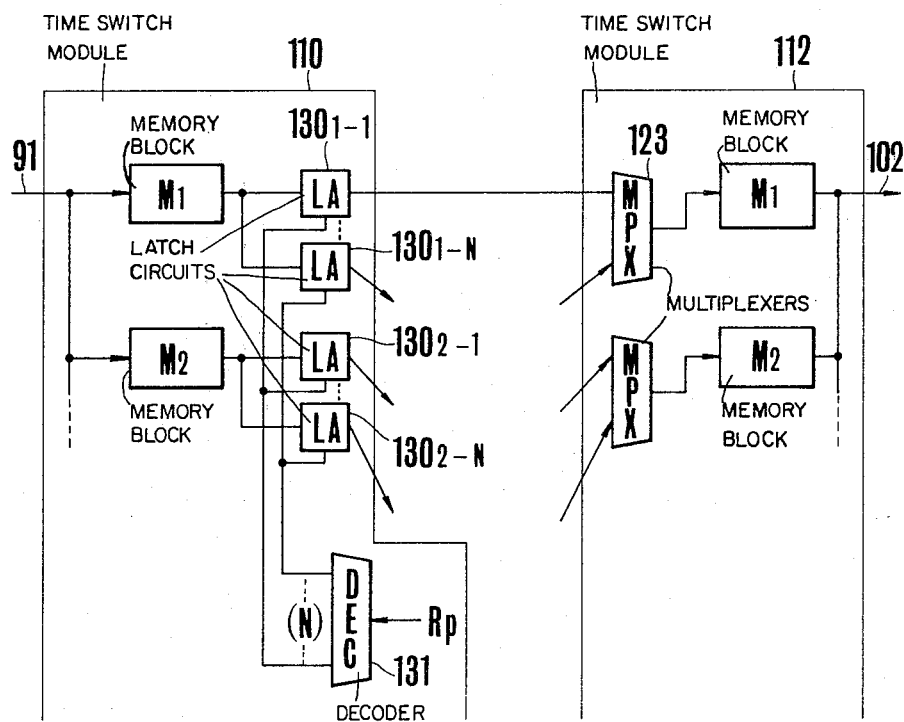

FIG. 21 shows a modification of the system shown in FIG. 20 in which N groups of latch circuits $130_{1\text{-}1}$–$130_{1\text{-}N}$, $130_{2\text{-}1}$–$130_{2\text{-}N}$ are provided on the output side of the primary time switch 110. The read out pulse Rp shown in FIG. 15 is divided into N systems by a decoder (DEC) 131 which are connected to respective latch circuits. A multiplexer (MPX) 123 is provided on the input side of the secondary time switch 12. With this construction, the operating phase of the junctor highway is divided into N. However, if the same phase is desired, a double buffer construction may be used, that is latch circuits operating at the same timing may be inserted on the output side of the primary time switch. This construction is advantageous for a switching network utilizing a long junctor cable because the signal speed on the junctor highway decreases with length. Furthermore, as the number of the time switch modules (TSM) 95, 95' increases, the number of the junctor highways also increases so that it becomes possible to connect all time switch modules with the junctors.

Figure 22:
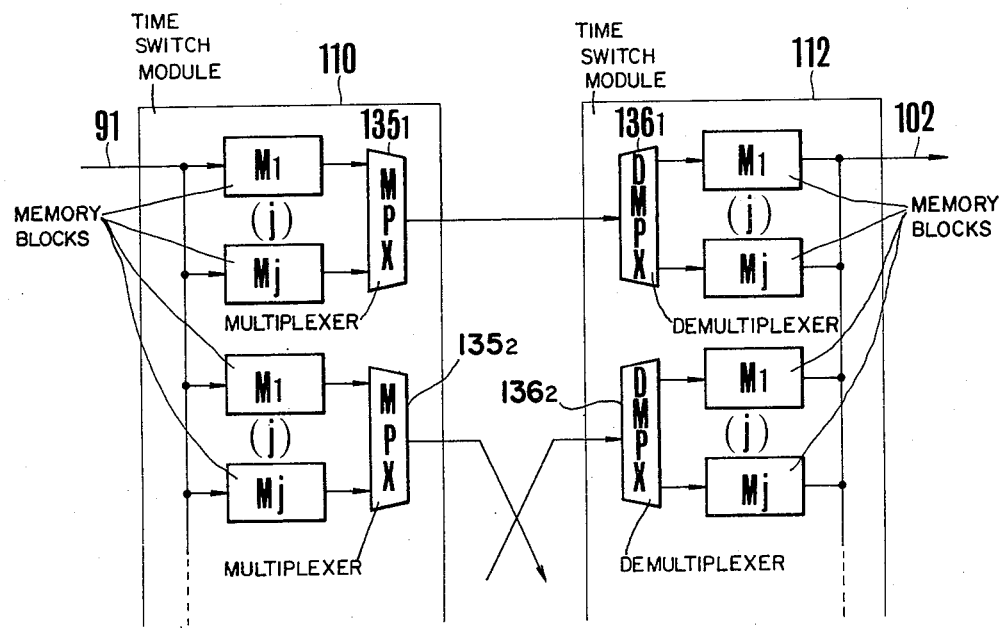

FIG. 22 shows still a further modification of the system shown in FIG. 20 in which the number of the memory blocks has been increased to j times the number of junctors. In this case, each group of j memory blocks (M) of the primary time switch 110 is connected to multiplexers (MPX) $135_1$, $135_2$ . . . and the multiplexed signals are sent to corresponding or any demultiplexers (DMPX) $136_1$, $136_2$ . . . on the input side of the secondary time switch 112. The outputs of the demultiplexers are connected to j memory blocks M1–Mj respectively on the output side of time switch 112. This construction reduces the number of the junctor highways.

Figure 23:
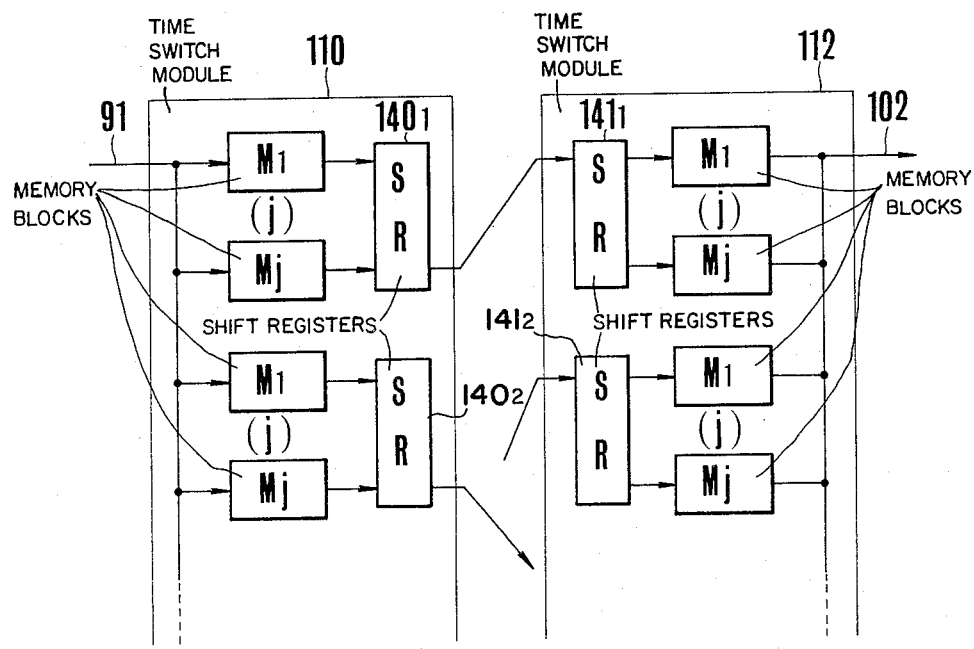

FIG. 23 shows a still further modification of the system shown in FIG. 22 in which j bit parallel-serial converter shift registers $140_1$, $140_2$ . . . are provided for each group of the memory blocks of the primary time switches 110. In the secondary time switch 112, the outputs of the shift registers $140_1$, $140_2$ . . . are received by corresponding shift registers $141_1$, $141_2$ . . . for effecting serial-parallel conversion. The operating period of the latch circuits provided on the sequential access side shown in FIG. 15 is decreased to 1/l of that of the random access side thus providing ample operating speed. Accordingly, when shift registers having parallel input-serial output or series input-parallel output performance are substituted for the latch circuits described above, both the latching function and the parallel-serial conversion or serial-parallel conversion function can be manifested.

Consequently, serial-parallel conversion performance can be provided for junctor units (a situation wherein the junctor side is sequentially accessed) or for the transmission line side (a situation wherein the transmission line side is sequentially accessed) without adding any component parts.

In the embodiments described above, for the purpose of effecting a pair control of the primary and secondary time switches TSW-F and TSW-B of the speech path units, a holding memory device was used in common thereto. The use of a common memory for pair control is not always necessary. Thus, independent memory devices may be used for respective time switches.

Figure 24A:
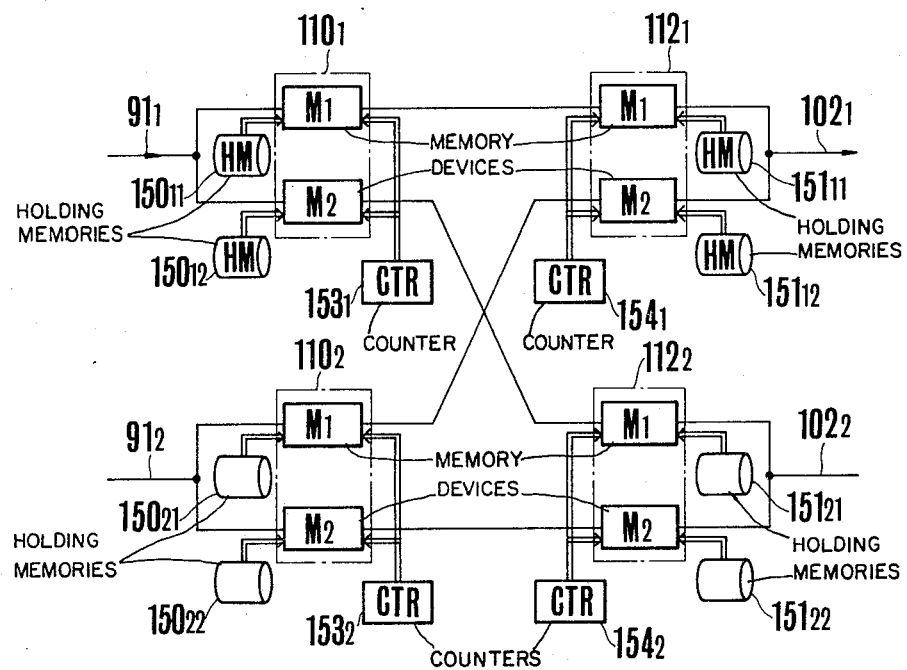
FIGS. 24A and 24B are connection diagrams useful to explain the manner of decreasing the time switch memories shown in FIG. 19.

FIG. 24A shows still another modification of the system shown in FIG. 19 in which the time switches have two stage construction. More particularly, on the input highway 91 side and on the outgoing highway 102 side, memory devices M, for example speech path memory devices, are randomly accessed by holding memory devices HM $150_{11}$, $150_{12}$, $151_{11}$, $151_{12}$, whereas on the junctor side the memory devices are sequentially accessed by counters $153_1$ and $154_1$. For simplifying the description the numbers of the primary and secondary time switches 110 and 112 are made to be two respectively.

In this manner, where the junctor side is sequentially accessed by counters 152 and 154 the content of the speech path memory device M1 in the primary time switch $110_1$ would be transferred to the speech path memory device M1 of the secondary time switch $112_1$ without any change.

Figure 24B:
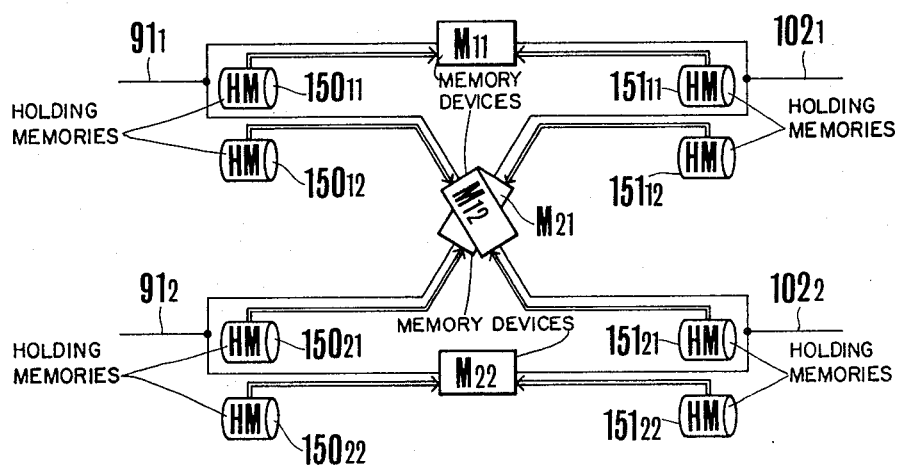

It is also possible to use four speech memory devices M11, M12, M21, M22 by using a speech path memory device in common for the primary and secondary time switches as shown in FIG. 24B. This arrangement can eliminate the counters shown in FIG. 24A so that the number of the speech path memory devices M is reduced to one half.

Figure 25:
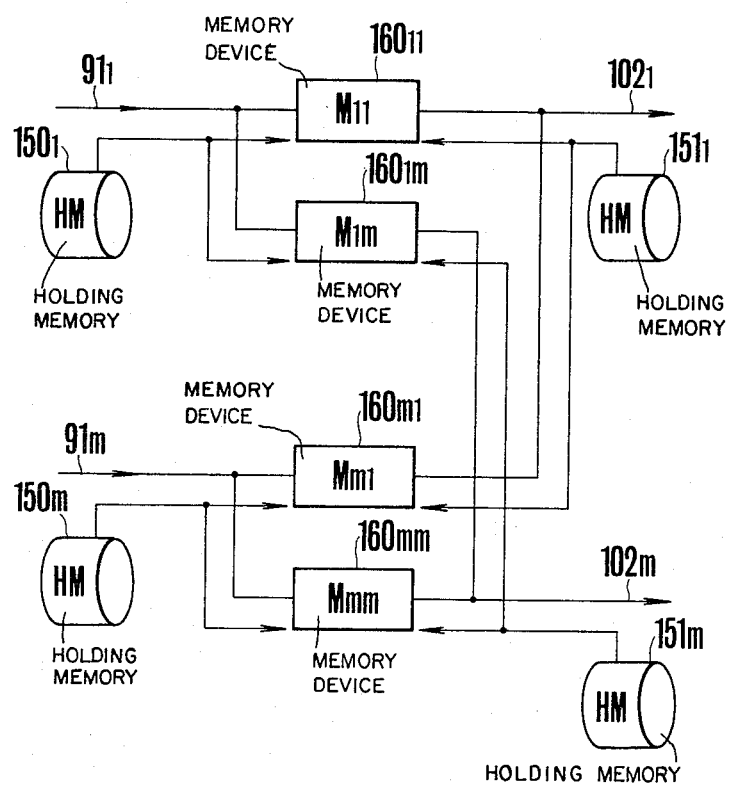
FIG. 25 is a block diagram useful to explain in detail the construction of the system shown in FIG. 24B.

FIG. 25 is a block diagram showing additional details of the system shown in FIG. 24B. In FIG. 25, each one of m incoming highways $91_1$–$91_m$ is multiplexed by n. In the same manner each one of m outgoing highways $102_1$–$102_m$ is also multiplexed by n. Each of $m^2$ memory devices $160_{11}$–$160_{mm}$ (M11–Mmm) has a capacity of n/m words. This capacity can be increased or decreased depending upon the quantity of the traffic flow and the internal blocking probability. Each one of the holding memory devices $150_1$–$150_m$ functions as a control memory device which designates the memory number and its address when time-division multiplexed signals arrive over respective highways $91_1$–$91_m$. Each of the hlding memory devices $151_1$–$151_m$ acts as a control memory device which designates the number of a read out memory device and the address thereof when a signal is read out from a memory device for the purpose of sending the signal to respective highways $102_1$–$102_m$.

Each holding memory device has a storing capacity of n words each having $\log_2 m + \log_2 2/m$, where $\log_2 m$ bits designate the number of the memory device while $\log_2 n/m$ bits designate the address number in the memory device. Generally stated, the holding memory device $150_1$ controls speech memory devices $160_{11}$–$160_{1m}$ whereas the holding memory device $151_1$ controls speech memory devices $160_{11}$–$160_{M1}$.

This method of control will now be described with reference to FIG. 26. Let us assume now that a line having a time slot number α of the incoming highway $91_1$ is to be connected to a line having a time slot number $\beta$ of the outgoing highway $102m$. The speech path memory device that can be used for establishing this connection is a memory device $160_{1m}$ and an idle address thereof can be selected by the central processing apparatus. Suppose now that an idle address "a" of the memory device $160_{1m}$ has been designated. Then m is written in the $\log_2 m$ bits of the address $\alpha$ of the holding memory device $150_1$ and a is written in the $\log_2 n/m$ bits so that, at the time slot $\beta$ of the outgoing highway $102m$, signal A stored in the address "a" of the speech path memory device $160_{1m}$ would be read out. In this manner, the time slot $\alpha$ of the incoming highway $91_1$ and the time slot $\beta$ of the outgoing highway $102m$ are connected together. The connection in the opposite direction (the connection between the time slot $\beta$ of the highway $91m$ and the time slot $\alpha$ of the highway $102_1$) is established in the same manner by using the speech path memory device $160_{m1}$. At this time, the operating period of the speech path memory device may be n times per frame for writing and reading respectively, so that the total number of the channels that can be exchanged is $n \times m$.

Figure 26:
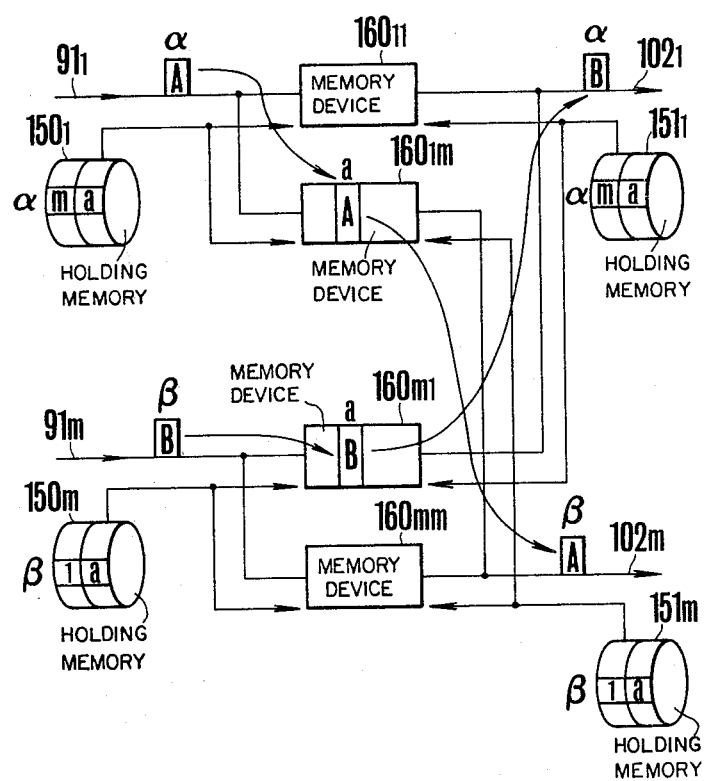
FIG. 26 is a connection diagram useful to explain the operation of the system shown in FIG. 25.

FIG. 27 shows a pair control system incorporated into the system shown in FIG. 25 or 26. In this case, the holding memory devices $170_1$–$170_m$ control commonly incoming highways and outgoing highways using the write addresses and the read out addresses of the information to the respective highways. To mutually connect the same highways the speech path memory device is read out during the fore half of one time slot and the data is written into the speech path memory device during the later half. Since the time division exchange operation is similar to that of the system shown in FIG. 26, its description is believed unnecessary.

The advantages of respective embodiments are as follows.

(1) According to the time division switching system of the invention, the time division switch digital trunk circuit and the speech path control equipment are grouped or integrated for a certain capacity, the junctor connection between integrated speech path units is made by a junctor switch unit (JSU) with a semipermanent path and as the scale of the network expands, the speech path units are built up like a building block structure. Accordingly, it is possible to readily expand the telephone network and to readily manufacture the telephone switching system.

(2) When line signals are transmitted and received they are put into idle time slots of the incoming and outgoing highways connected to the switching system by using CODECs or synchronizing circuits and then applied to a digital trunk circuit through junctor switch units and time division switches by way of permanent paths. For this reason, not only the hardware but also the software of the speech path control equipment can be manufactured as modules.

(3) According to the embodiment of this invention shown in FIG. 2 through 13, the time division switches TDS, the digital trunk circuit DTRK, the onward and backward time division speech path connecting equipments TDC-F, TDC-B, and the speech path control equipment SPC for these equipments which constitute a time division telephone switching system, are constructed as an integral unit, and a common spare unit is prepared for a plurality of units. Consequently, when a normally used unit becomes faulty, this unit can be smoothly switched to an inactive status and the spare unit inserted in its place by a transfer switch and a junctor switch. By this means, it is possible to decrease the amount of work and the amount of program processing not only for the purpose of fault processing but also for expanding the network.

(4) Transfer operation of the junctor switches is effected by handling a plurality of channels as one bundle or group and the transfer operation is performed only when a traffic flow unbalance occurs, or when trouble occurs in the speech path unit or when the capacity of the network is to be expanded, and not for controlling a call. As a consequence, it is possible to decrease the capacity of the memory device utilized in the junctor switch and the amount of control of the holding memory device, thus simplifying the construction of the overall system.

(5) Furthermore, as shown in FIG. 13, when a traffic flow control device is added to each integral unit made up of the time division switch, the digital trunk circuit, the onward and backward time division speech path connecting equipment and the speech path control equipment so as to permit the traffic flow control device to process the traffic through the network, it becomes possible to complete a series of traffic flow controls in each integral unit. This in turn makes it possible to prevent shut down of the entire switching office even when after a first specific integral unit becomes faulty another integral unit becomes faulty while said first mentioned faulty unit is being switched to a stand-by or spare mode unit, thus preventing double or tripple faults.

(5) When considering the selection of an idle speech channel, since a time switch is provided in two stages it is possible to reduce the number of the switching program steps, such as channel alignment. Moreover, with this two stage construction of the time switch there are additional advantages that the capacity for treating unbalance in the traffic flow can be increased, and that the rearrangement of the junctor cables can be simplified at the time of expanding the telephone network. More particulatly, junctor switches that permit electrical time division reconnection of the junctors, are installed between primary and secondary time switches. Accordingly, under normal conditions, a specific pattern is established but when the traffic flow becomes unbalanced or when the network is to be expanded, the connection pattern is changed. This ability to rearrange connection patterns can solve problems which otherwise occur if two stage time switches are used to contruct the telephone network. When changing the connection pattern of the junctor switches it is not always necessary to make each channel controllable but the channel can be switched as channel bundle units. This decreases the bit capacity desired for the junctor switch holding memory device thus not only miniaturizing the system but also simplifying the processing of switching network.

(6) According to the embodiments shown in FIGS. 13 through 23, since the memory device which constitute a part of the time switch is divided into a plurality of blocks, the numbers of multiplexing and demultiplexing circuits become unnecessary when the memory blocks are accessed in parallel thus decreasing the access time of the memory device to one half. This not only alleviates the cycle time requirements of the memory device but also simplifies peripheral circuits associated with the memory device. Furthermore, when a simple two stage time switch having a simple control algorithm is used in the system, it is possible to form junctors between primary and secondary time switches without adding new circuits.

By increasing or decreasing the number of memory blocks with a predetermined redundancy it is possible to adjust the number of the junctors between the primary and secondary switches without increasing the operating speed of the memory device.

(7) Furthermore, according to the embodiments, shown in FIGS. 24 through 27, the speech path memory device in a time switch is divided into a plurality of blocks which are arranged in a matrix so as to enable the incoming highway to access the memory blocks belonging to the same row and the outgoing highway to access the memory blocks of the same column number. As a consequence, it is possible to increase the capacity of the time switch without redundantly using the memory device and without increasing the operating speed thereof. Thus, according to this invention it becomes possible to fabricate a time division switching network by using a large capacity time switch which is constituted by an inexpensive memory device that can be fabricated as an integrated circuit. Thus, it is possible to readily increase the capacity of a time division switching network. When it is desired to increase further the capacity of the network, the capacity can be increased by combining time switches or space switches in many stages.

Although the invention has been shown and described in terms of specific embodiments, it will be clear to those skilled in the art that many changes and modifications can be made in the particular embodiments of the invention disclosed which come within the full intended scope of the invention as defined by the appended claims.

What is claimed is:

1. A time division telephone switching system in which the time division multiplexed signals are exchanged, said system comprising:
a plurality of speech path units;
a junctor switch unit for interconnecting said plurality of speech path units; and
a central processing unit for effecting an overall control of said speech path units and said junctor switch unit;
each one of said speech path units comprising time division switch means for exchanging signals between predetermined time slots, said signals being time-divisioned and multiplexed into a plurality of groups of time slots with each group comprising a plurality of time slots, a digital trunk circuit means which processes a channel associated signal containing a register signal identification and a line operating state, and speech path control equipment receiving and distributing control signals, which includes an interface between said time division switch means, said digital trunk circuit and said central processing unit;
said junctor switch unit being constructed to establish connections and reconnections between respective speech path units by treating a plurality of time slots as one group whereby changes in connection between respective speech path units results in effecting switching of the time slots by respective groups.

2. A time division telephone switching system according to claim 1 which further comprises a spare mode speech path unit provided in common for said plurality of speech path units, a testing unit and switching means all under control of said central processing unit for substituting said spare mode speech path unit for a faulty speech path unit which is used normally when a fault occurs thereon and for automatically connecting the faulty unit to the test unit for testing and repair.

3. A time division telephone switching system according to claim 2 which further comprises a spare mode junctor switch unit and means controlled by said central processing unit for substituting said spare mode junctor switch unit for said junctor switch unit when a fault occurs thereon.

4. A time division telephone switching system according to claim 3 wherein said time division switch means comprises two cascade connected time switches, and said junctor switch unit is arranged between said time switches.

5. A time division telephone switching system in which time division multiplexed signals are exchanged, said system comprising:
incoming and outgoing highways each including a plurality of time slots which receive time division multiplexed signals;
a plurality of speech path units;
a spare mode speech path unit;
a junctor switch unit for interconnecting said plurality of speech path units and said spare mode speech path unit;
test means;
change-over switch means including a pair of change-over switches for switching the connections between respective speech path units, said spare mode speech path unit, said incoming and outgoing highways and said test means; and
a central processing unit for providing an overall control of said speech path units and said change-over switch means;
each one of said speech path units including time division switch means for exchanging said multiplexed signals between predetermined time slots and grouping a plurality of time slots into a plurality of groups of a plurality of time slots, a digital trunk circuit which processes a channel associated signal containing a register signal identification and a line operating state, and a speech path control equipment receiving and distributing control signals which includes an interface between said time division switch means, said digital trunk circuit and said central processing unit;
said junctor switch unit being constructed to establish and reestablish connections between respective speech path units by treating each group of a plurality of time slots as a group whereby changes in connections between respective speech path units results in effecting switching of the time slots by respective groups; and
said change-over switch means being controlled by said central processing unit for substituting said spare mode speech path unit and said incoming and outgoing highways for a speech path unit which is used normally and a fault occurs therein and for connecting said test means to said faulty speech path unit.

6. A time division telephone switching system according to claim 5 wherein said test means is normally connected to said spare mode speech path unit through said change-over switch when normally used speech path units operate normally thereby confirming the normality thereof.

7. A time division telephone switching system according to claim 5 which further comprises means for constantly supervising faulty condition of said speech path units and upon occurrence of a fault, said central processing unit controls said change-over switch means in response to the output of said supervisory means.

8. A time division telephone switching system in which time division multiplexed signals are exchanged, said system comprising:
 a plurality of speech path units;
 a junctor switch unit for establishing connections between said plurality of speech path units; and
 a central processing unit for providing overall control of said speech path units;
 each one of said speech path units including time division switch means for exchanging said time division multiplexed signals between predetermined time slots to form respective groups of a plurality of time slots, a digital trunk circuit means for processing a channel associated signal containing a register signal identification and a line operating state, and a speech path control equipment receiving and distributing control signals, which includes an interface between said time division switch means, said digital trunk circuit means and said central processing unit;
 said junctor switch unit being constructed to establish connections and reconnections between respective speech path units by treating each group of a plurality of time slots as a switching group and changes in connections between respective speech path units results in switching of the time slots by respective groups; and
 said junctor switch unit including a time division junctor switch and a junctor switch holding memory device which controls said time division junctor switch under a control of said central processing unit.

9. A time division telephone switching system according to claim 8 wherein said junctor switch unit is provided in duplicate.

10. A time division telephone switching system according to claim 8 wherein each one of said speech path units comprises junctor change-over switch means which determines which one of the outputs of the junctor units of the system should be received, said junctor change-over switch means being under control of said speech path control equipment.

11. A time division telephone exchange system in which time division multiplexed signals are exchanged, said system comprising:
 a plurality of speech path units;
 a junctor switch unit for interconnecting said plurality of speech path units;
 a central processing unit for effecting an overall control of the interconnection and operation of said speech path units;
 each one of said speech path units including time division switch means for exchanging said signals between predetermined time slots to form respective groups of time slots with each group having a plurality of time slots, a digital trunk circuit means for processing a channel associated signal containing a register signal identification and a line operating state, and speech path control equipment receiving and distributing control signals which includes an interface between said time division switch means, said digital trunk circuit and said central processing unit;
 said junctor switch unit being constructed to establish and reestablish connections between respective speech path units by treating each group of a plurality of time slots as a switching group whereby changes in interconnections between the speech path units by said junctor switch unit results in switching of the time slots by respective groups;
 an additional trunk circuit means which supervises a speech state of an analogue line, transmits and receives a dial pulse and shares a portion of the processings of various signals executed by said central processing unit; and
 means connected to the output of said additional trunk circuit means for converting a voice signal into a form that can be applied to and taken out from said time division switches.

12. A time division telephone switching system in which time division multiplexed signals are exchanged, said system comprising:
 a plurality of speech path units;
 a junctor switch unit for interconnecting said plurality of speech channel units;
 a central processing unit for providing an overall control of said speech path units;
 each one of said speech path units including time division switch means for exchanging said signals between predetermined time slots to form respective groups of time slots with each group having a plurality of time slots, a digital trunk circuit means for processing a channel associated signal containing a register signal identification and a line operating state, and speech path control equipment for receiving and distributing a control signal, which includes an interface between said time division switch means, said digital trunk circuit means and said central processing unit;
 said junctor switch unit being constructed to establish connections and reconnections between said speech channel units by treating each group of a plurality of time slots as a switching group;
 control means for controlling processing in each speech path unit and in each junctor switch unit; and
 said central processing unit executing process controls involving only a plurality of speech path units and supervising the operation of the control means in each speech path unit.

13. A time division telephone switching system in which time division multiplexed signals are exchanged, said system comprising:
 a plurality of speech path units;
 a junctor switch unit for interconnecting said plurality of speech path units; and
 a central processing unit for effecting overall control of said speech path units and said junctor switch unit;
 each one of said speech path units including time division switch means for exchanging signals between predetermined time slots and forming respective groups of time slots with each group comprising a plurality of time slots, a digital trunk circuit means for processing a channel associated signal containing a register signal identification and a line operating state signal, and speech path control equipment receiving and distributing control signals which include an interface between said time division switch means, said digital trunk circuit means, and said central processing unit;

said junctor switch unit being constructed to establish connections and reconnections between said speech path units by treating each group of a plurality of time slots as a respective switching group which is switched as a group by operation of the junctor switch unit;

said time division switch means including memory means for temporarily storing speech information at the time of a switching operation, said memory means being divided into a plurality of memory blocks;

means for accessing a predetermined one of said memory blocks at an access time on a random access side of said memory means; and means for parallel accessing a plurality of memory blocks at an access time on a sequential access side of said memory means, thereby writing and reading said speech information, wherein K/l of the multiplicity of the highway on the random access side are used as invalid time slots, and a random access time corresponding to said invalid time slot is also used as a sequential access time where K represents the multiplicity of highways on the random access side and l represents the number of said blocks of said memory means.

14. A time division telephone switching system according to claim 13 which further comprises a shift register which operates as a serial input and parallel output on said sequential access side of said memory means.

15. A time division telephone switching system according to claim 13 wherein the number of blocks of said memory means is variable.

16. A time division telephone switching system according to claim 13 wherein a portion of said invalid time slot is operated at a spare access time.

17. A time division telephone switching system in which time division multiplexed signals are exchanged, said system comprising:

a plurality of speech path units;

a junctor switch unit for interconnecting said plurality of speech path units; and a central processing unit for effecting overall control of said speech path units and said junctor switch unit, each one of said speech channel units including time division switch means for exchanging signals between predetermined time slots to form a plurality of groups of time slots with each group comprising a plurality of time slots, digital trunk circuit means for processing a channel associated signal containing a register signal identification and a line operating state signal, and speech path control equipment for receiving and distributing control signals which includes interfaces between said time division switches, said digital trunk circuit means and said central processing unit;

said junctor switch unit being constructed to establish connections and reconnections between said speech path units by treating each group of a plurality of time slots as a respective switching group that is switched as a group by said junctor switch unit;

said time division switches being constructed in two stages and including memory means for temporarily storing speech information at the time of switching, said memory means being divided into a plurality of memory blocks;

means for accessing a predetermined one of said memory blocks at an access time by randomly accessing either a highway on a transmission line side or a highway on a junctor side; and means for parallel accessing a plurality of said memory blocks at an access time by sequentially accessing either one of said highways, wherein the number of said memory blocks corresponds to the number of junctor highways, and wherein K/l of the multiplicity of the highways on the random access side are used as invalid time slots, and random access times corresponding to said invalid time slots are used also as a sequential access time where K represents the multiplicity of the highways on the random access side, and l represents the number of the memory blocks.

18. A time division telephone switching system according to claim 17 wherein the number of said memory blocks is 1/N, where N represents the number of junctor highways, and which further comprises a decoder which distributes a data read out by said sequential access among N junctor highways, and a multiplexing circuit which multiplexes N highways into a single highway on a side of said memory blocks on which data writing is made by said sequential access.

19. A time division telephone switching system according to claim 17 wherein the number of said memory blocks is 1/N, where N represents the number of junctor highways, and wherein said system further comprises N groups of latch circuit provided on the read out side by the sequential access, means for dividing a read out pulse on said read out side into N pulses for applying the same to said N groups of the latch circuits, and a multiplexing circuit which multiplexes N highways into a single highway on a side of said memory blocks on which data writing is mode by said sequential access.

20. A time division telephone switching system according to claim 17 wherein the number of said memory blocks is N', where N' represents the number of junctor highways, and wherein said system further comprises a multiplexing circuit which multiplexes the outputs of N' memory blocks into a single highway on a side of the memory blocks on which data is read out by sequential access, and a decoder which distributes data among N' highways on a side of the memory blocks on which data is written by sequential access.

21. A time division telephone switching system according to claim 17 which further comprises a shift register which acts as a serial input and parallel output on said sequential access side of the memory blocks.

22. A time division telephone switching system according to claim 17 wherein the number of said divided memory blocks is variable.

23. A time division telephone switching system according to claim 17 wherein a portion of said invalid time slots is used at a spare mode access time.

24. A time division multiplexed telephone switching system in which time division multiplexed signals are exchanged, said system comprising:

a plurality of speech path units;

a junctor switch unit for interconnecting said plurality of speech path units;

a central processing unit for effecting an overall control of said speech path units and said junctor switch unit;

each one of said speech path units including a time division speech channel unit for exchanging signals between predetermined groups of time slots with each group comprising a plurality of time slots, a digital trunk circuit means for processing a channel associated signal containing a register signal identification and a line operating state signal, and speech path control equipment receiving and distributing control signals and which includes an interface connection with said time division speech channel unit, and with said digital trunk circuit means;

said junctor switch unit being constructed to establish connections and reconnections between said plurality of speech path units by using each group of a plurality of time slots as a respective switching group that is switched as a group by said junctor switch unit;

said time division speech channel units including time division switch means which includes a speech path memory device for temporarily storing speech information at the time of switching, said memory device being divided into $m^2$ memory blocks, where m in an integer larger than 2; said divided memory blocks being assigned with column and row numbers of a matrix having m columns and m rows, means for accessing an incoming highway to a predetermined address of a memory block belonging to a column of said matrix corresponding to said incoming highway, and means for accessing an outgoing highway to a predetermined address of a memory block belonging to a column of said matrix corresponding to said outgoing highway.

25. A time division telephone switching system according to claim 24 wherein the number of the words of each memory block is varied by n/m depending upon such conditions as the efficiency of utilization of a highway, and the internal blocking probability of said telephone switching system, and wherein n represents the multiplicity of said highway and m the number of the column or row of said matrix.

26. A time division telephone switching system in which time division multiplexed signals are exchanged, said system comprising:

a plurality of speech path units;

a junctor switch unit for interconnecting said plurality of speech path units;

a central processing unit for effecting an overall control of said speech path units and said junctor switch unit;

each one of said speech path units including time division switch means for exchanging said signals between predetermined groups of time slots with each group comprising a plurality of time slots, digital trunk circuit means for processing a channel associated signal containing a register indentification signal and a line operating state signal, and speech path control equipment receiving and distributing control signals which includes interfaces between said time division speech channel unit, said digital trunk circuit means and said central processing unit;

said junctor switch unit being constructed to establish connections and reconnections between said speech path units by treating each group of a plurality of time slots as a respective switching group that is switched as a group by said junctor switch unit;

said time division switch means further including a speech path memory device adapted to temporarily store speech information at the time of switching operation, said memory device being divided into $m^2$ memory blocks (where m is an integer larger than 2) adapted to control write and read out addresses, said memory blocks being assigned with column and row numbers of a matrix having m columns and m rows, means for accessing an incoming highway to a predetermined address of a memory block belonging to a column of said matrix corresponding to said incoming highway, means for accessing an outgoing highway to a predetermined address of a memory block belonging to a column of said matrix corresponding to said outgoing highway, a holding memory device for commonly controlling a memory block of said speech path memory device for controlling a write address and a memory block for controlling a read out address, means for supplying a write address to a memory block belonging to a row of said matrix corresponding to the number of said address controlling memory device, and means for supplying a read out address to a memory block belonging to a column of said matrix corresponding to the number of said address controlling memory device, thereby causing an access time of said speech path memory device which is allocated to read out operation, and an access time allocated to write operation, said access times occurring at least twice per one time slot.

27. A time division telephone switching system according to claim 26 wherein the number of the words of each memory block is varied by n/m depending upon such conditions as the efficiency of utilization of the highway and the internal blocking probability of the highway wherein n represents the multiplicity of the highway and m the number of columns or rows of a matrix of said memory blocks.

* * * * *